US012764277B2

(12) United States Patent
Tsai et al.

(10) Patent No.: US 12,764,277 B2
(45) Date of Patent: Oct. 13, 2026

(54) METHOD AND APPARATUS OF INHERITING CROSS-COMPONENT MODELS WITH CROSS-COMPONENT INFORMATION PROPAGATION IN VIDEO CODING SYSTEM

(71) Applicant: MEDIATEK INC., Hsinchu City (TW)

(72) Inventors: Chia-Ming Tsai, Hsinchu City (TW); Yu-Ling Hsiao, Hsinchu City (TW); Hsin-Yi Tseng, Hsinchu City (TW); Cheng-Yen Chuang, Hsinchu City (TW); Chen-Yen Lai, Hsinchu City (TW); Chih-Wei Hsu, Hsinchu City (TW); Yi-Wen Chen, San Jose, CA (US); Ching-Yeh Chen, Hsinchu City (TW); Tzu-Der Chuang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 19/131,013

(22) PCT Filed: Nov. 16, 2023

(86) PCT No.: PCT/CN2023/131986
§ 371 (c)(1),
(2) Date: May 19, 2025

(87) PCT Pub. No.: WO2024/109618
PCT Pub. Date: May 30, 2024

(65) Prior Publication Data

US 2026/0197444 A1 Jul. 9, 2026

Related U.S. Application Data

(60) Provisional application No. 63/384,449, filed on Nov. 21, 2022.

(51) Int. Cl.
*H04N 19/109* (2014.01)
*H04N 19/105* (2014.01)
(Continued)

(52) U.S. Cl.
CPC ......... *H04N 19/109* (2014.11); *H04N 19/105* (2014.11); *H04N 19/176* (2014.11); *H04N 19/186* (2014.11)

(58) Field of Classification Search
None
See application file for complete search history.

(56) References Cited

U.S. PATENT DOCUMENTS

2017/0244975 A1 8/2017 Huang et al.
2022/0150541 A1 5/2022 Liu et al.

FOREIGN PATENT DOCUMENTS

WO 2021190440 A1 9/2021

OTHER PUBLICATIONS

Li, Xinwei et al. "EE2-1.7: CCLM with non-linear term (JVET-AB0091-v1)" (published on Oct. 28, 2022).

(Continued)

*Primary Examiner* — Christopher Braniff
(74) *Attorney, Agent, or Firm* — McClure, Qualey & Rodack, LLP

(57) ABSTRACT

Methods and apparatus for video coding using inherited cross-component information propagation or innovative default cross-component candidate. According to the first method, an inherited cross-component prediction candidate is derived by inheriting one or more cross-component model parameters associated with an inheriting neighbouring block. The inherited cross-component prediction candidate is stored and used in a reconstruction process of a neighbouring block in a subsequent picture. According to the second method, a default cross-component prediction can- (Continued)

didate is generated by using neighbouring reconstructed first-colour samples and second-colour samples of the current block to derive a cross-component model for the default cross-component prediction candidate, or by using partial model parameters or modifying model parameters associated with an earlier candidate to derive the cross-component model for the default cross-component prediction candidate.

17 Claims, 14 Drawing Sheets

(51) Int. Cl.
*H04N 19/176* (2014.01)
*H04N 19/186* (2014.01)

(56) References Cited

OTHER PUBLICATIONS

Kuo, Che-Wei et al. "AHG12: Enhanced CCLM (JVET-Z0140-v2)" (published on Apr. 29, 2022).
International Search Report and Written Opinion dated Feb. 8, 2024, issued in application No. PCT/CN2023/131986.

METHOD AND APPARATUS OF INHERITING CROSS-COMPONENT MODELS WITH CROSS-COMPONENT INFORMATION PROPAGATION IN VIDEO CODING SYSTEM

CROSS REFERENCE TO RELATED APPLICATIONS

The present invention is a non-Provisional Application of and claims priority to U.S. Provisional Patent Application No. 63/384,449, filed on Nov. 21, 2022. The U.S. Provisional Patent Application is hereby incorporated by reference in its entirety.

FIELD OF THE INVENTION

The present invention relates to video coding system. In particular, the present invention relates to inheriting cross-component models for non-intra coded blocks and the use of default cross-component prediction candidate in a video coding system.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video encoding system incorporating loop processing. For Intra Prediction 110, the prediction data is derived based on previously coded video data in the current picture. For Inter Prediction 112, Motion Estimation (ME) is performed at the encoder side and Motion Compensation (MC) is performed based on the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. Some new tools relevant to the present invention are reviewed as follows.

Intra Mode Coding with 67 Intra Prediction Modes

To capture the arbitrary edge directions presented in natural video, the number of directional intra modes in VVC is extended from 33, as used in HEVC, to 65. The new directional modes not in HEVC are depicted as red dotted arrows in FIG. 2, and the planar and DC modes remain the same. These denser directional intra prediction modes apply for all block sizes and for both luma and chroma intra predictions.

In VVC, several conventional angular intra prediction modes are adaptively replaced with wide-angle intra prediction modes for the non-square blocks.

In HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

To keep the complexity of the most probable mode (MPM) list generation low, an intra mode coding method with 6 MPMs is used by considering two available neighbouring intra modes. The following three aspects are considered to construct the MPM list:

Default intra modes
Neighbouring intra modes
Derived intra modes.

A unified 6-MPM list is used for intra blocks irrespective of whether MRL and ISP coding tools are applied or not. The MPM list is constructed based on intra modes of the left and above neighbouring block.

Cross-Component Linear Model (CCLM) Prediction

To reduce the cross-component redundancy, a cross-component linear model (CCLM) prediction mode is used in the VVC, for which the chroma samples are predicted based on the reconstructed luma samples of the same CU by using a linear model as follows:

$$pred_C(i, j) = \alpha \cdot rec'_L(i, j) + \beta \tag{1}$$

where $pred_C(i, j)$ represents the predicted chroma samples in a CU and $rec_L'(i, j)$ represents the downsampled reconstructed luma samples of the same CU.

The CCLM parameters (α and β) are derived with at most four neighbouring chroma samples and their corresponding down-sampled luma samples. Suppose the current chroma block dimensions are W×H, then W' and H' are set as W'=W, H'=H when LM_LA mode is applied;
W'=W+H when LM_A mode is applied;
H'=H+W when LM_L mode is applied.

The above neighbouring positions are denoted as S[0, −1] . . . . S[W'−1, −1] and the left neighbouring positions are denoted as S[−1, 0] . . . . S[−1, H'−1]. Then the four samples are selected as S[W'/4, −1], S[3*W'/4, −1], S[−1, H'/4], S[−1, 3*H'/4] when LM mode is applied and both above and left neighbouring samples are available;

S[W'/8, −1], S[3*W'/8, −1], S[5*W'/8, −1], S[7*W'/8, −1] when LM-A mode is applied or only the above neighbouring samples are available;

S[−1, H'/8], S[−1, 3*H'/8], S[−1, 5*H'/8], S[−1, 7*H'/8] when LM-L mode is applied or only the left neighbouring samples are available.

The four neighbouring luma samples at the selected positions are down-sampled and compared four times to find two larger values: $x^0_A$ and $x^1_A$, and two smaller values: $x^0_B$ and $x^1_B$. Their corresponding chroma sample values are denoted as $y^0_A$, $y^1_A$, $y^0_B$ and $\alpha^1_B$. Then $x_A$, $x_B$, $y_A$ and $y_B$ are derived as:

$$Xa = (x0A + x1A + 1) \gg 1; \tag{2}$$

$$Xb = (x0B + x1B + 1) \gg 1;$$

$$Ya = (y0A + y1A + 1) \gg 1;$$

$$Yb = (y0B + y1B + 1) \gg 1;$$

Finally, the linear model parameters α and β are obtained according to the following equations.

$$\alpha = \frac{Y_a - Y_b}{X_a - X_b} \tag{3}$$

$$\beta = Y_b - \alpha \cdot X_b \tag{4}$$

FIG. 3 shows an example of the location of the left and above samples and the sample of the current block involved in the LM_LA mode. FIG. 3 shows the relative sample locations of N×N chroma block 310, the corresponding 2N×2N luma block 320 and their neighbouring samples (shown as filled circles).

The division operation to calculate parameter α is implemented with a look-up table. To reduce the memory required for storing the table, the diff value (difference between maximum and minimum values) and the parameter α are expressed by an exponential notation. For example, diff is approximated with a 4-bit significant part and an exponent. Consequently, the table for 1/diff is reduced into 16 elements for 16 values of the significand as follows:

$$DivTable[\ ] = \{0, 7, 6, 5, 5, 4, 4, 3, 3, 2, 2, 1, 1, 1, 1, 0\} \tag{5}$$

This would have a benefit of both reducing the complexity of the calculation as well as the memory size required for storing the needed tables.

Besides the above template and left template can be used to calculate the linear model coefficients together, they also can be used alternatively in the other 2 LM modes, called LM_A, and LM_L modes.

In LM_A mode, only the above template is used to calculate the linear model coefficients. To get more samples, the above template is extended to (W+H) samples. In LM_L mode, only left template are used to calculate the linear model coefficients. To get more samples, the left template is extended to (H+W) samples.

In LM_LA mode, left and above templates are used to calculate the linear model coefficients.

To match the chroma sample locations for 4:2:0 video sequences, two types of down-sampling filter are applied to luma samples to achieve 2 to 1 down-sampling ratio in both horizontal and vertical directions. The selection of down-sampling filter is specified by a SPS level flag. The two down-sampling filters are as follows, which are corresponding to "type-0" and "type-2" content, respectively.

$$Rec'_L(i, j) = [rec_L(2i-1, 2j-1) + 2 \cdot rec_L(2i-1, 2j-1) + rec_L(2i+1, 2j-1) + rec_L(2i-1, 2j) + 2 \cdot rec_L(2i, 2j) + rec_L(2i+1, 2j) + 4] \gg 3 \tag{6}$$

$$Rec'_L(i, j) = rec_L(2i, 2j-1) + rec_L(2i-1, 2j) + 4 \cdot rec_L(2i, 2j) + rec_L(2i+1, 2j) + rec_L(2i, 2j+1) + 4] \gg 3 \tag{7}$$

Note that only one luma line (general line buffer in intra prediction) is used to make the down-sampled luma samples when the upper reference line is at the CTU boundary.

This parameter computation is performed as part of the decoding process, and is not just as an encoder search operation. As a result, no syntax is used to convey the α and β values to the decoder.

For chroma intra mode coding, a total of 8 intra modes are allowed for chroma intra mode coding. Those modes include five traditional intra modes and three cross-component linear model modes (LM_LA, LM_A, and LM_L). Chroma mode signalling and derivation process are shown in Table 1. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the centre position of the current chroma block is directly inherited.

TABLE 1

Derivation of chroma prediction mode from luma mode when CCLM is enabled

| Chroma | Corresponding luma intra prediction mode | | | | |
|---|---|---|---|---|---|
| prediction mode | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

Multiple Model CCLM (MMLM)

In the JEM (J. Chen, E. Alshina, G. J. Sullivan, J.-R. Ohm, and J. Boyce, Algorithm Description of Joint Exploration Test Model 7, document JVET-G1001, ITU-T/ISO/IEC Joint Video Exploration Team (JVET), July 2017), multiple model CCLM mode (MMLM) is proposed for using two models for predicting the chroma samples from the luma samples for the whole CU. In MMLM, neighbouring luma samples and neighbouring chroma samples of the current block are classified into two groups, each group is used as a training set to derive a linear model (i.e., a particular α and β are derived for a particular group). Furthermore, the samples of the current luma block are also classified based on the same rule for the classification of neighbouring luma samples. Three MMLM model modes (including MMLM_LA, MMLM_T, and MMLM_L) are allowed for choosing the neighbouring samples from left-side and above-side, above-side only, and left-side only, respectively.

FIG. 4 shows an example of classifying the neighbouring samples into two groups. Threshold is calculated as the average value of the neighbouring reconstructed luma samples. A neighbouring sample with $Rec'_L[x,y]$<=Threshold is classified into group 1; while a neighbouring sample with $Rec'_L[x,y]$>Threshold is classified into group 2.

$$\begin{cases} Pred_c[x, y] = \alpha_1 \times Rec'_L[x, y] + \beta_1 & \text{if } Rec'_L[x, y] \le \text{Threshold} \\ Pred_c[x, y] = \alpha_2 \times Rec'_L[x, y] + \beta_2 & \text{if } Rec'_L[x, y] > \text{Threshold} \end{cases} \quad (8)$$

Accordingly, the MMLM uses two models according to the sample level of the neighbouring samples.

Slope Adjustment of CCLM

CCLM uses a model with 2 parameters to map luma values to chroma values as shown in FIG. 5A. The slope parameter "a" and the bias parameter "b" define the mapping as follows:

$$chromaVal = a * lumaVal + b$$

An adjustment "u" to the slope parameter is signalled to update the model to the following form, as shown in FIG. 5B:

$$chromaVal = a' * lumaVal + b'$$

where $$a' = a + u,$$

$$b' = b - u * y_r.$$

With this selection, the mapping function is tilted or rotated around the point with luminance value yr. The average of the reference luma samples used in the model creation as yr in order to provide a meaningful modification to the model. FIGS. 5A and 5B illustrates the process.

Implementation of Slope Adjustment of CCLM

Slope adjustment parameter is provided as an integer between −4 and 4, inclusive, and signalled in the bitstream. The unit of the slope adjustment parameter is (⅛)-th of a chroma sample value per luma sample value (for 10-bit content).

Adjustment is available for the CCLM models that are using reference samples both above and left of the block (e.g. "LM_CHROMA_IDX" and "MMLM_CHROMA_IDX"), but not for the "single side" modes. This selection is based on coding efficiency versus complexity trade-off considerations. "LM_CHROMA_IDX" and "MMLM_CHROMA_IDX" refers to CCLM_LT and MMLM_LT in this invention. The "single side" modes refers to CCLM_L, CCLM_T, MMLM_L, and MMLM_T in this invention.

When slope adjustment is applied for a multimode CCLM model, both models can be adjusted and thus up to two slope updates are signalled for a single chroma block.

Convolutional Cross-Component Model (CCCM)—Single Model and Multi-Model

In CCCM, a convolutional model is applied to improve the chroma prediction performance. The convolutional model has 7-tap filter consisting of a 5-tap plus sign shape spatial component, a nonlinear term and a bias term. The input to the spatial 5-tap component of the filter consists of a centre (C) luma sample which is collocated with the chroma sample to be predicted and its above/north (N), below/south(S), left/west (W) and right/east (E) neighbours as shown in FIG. 6.

The nonlinear term (denoted as P) is represented as power of two of the centre luma sample C and scaled to the sample value range of the content:

$$P = (C * C + midVal) \gg bitDepth.$$

For example, for 10-bit contents, the nonlinear term is calculated as:

$$P=(C*C+512)\gg 10$$

The bias term (denoted as B) represents a scalar offset between the input and output (similarly to the offset term in CCLM) and is set to the middle chroma value (512 for 10-bit content).

Output of the filter is calculated as a convolution between the filter coefficients $c_i$ and the input values and clipped to the range of valid chroma samples:

$$predChromaVal=c_0C+c_1N+c_2S+c_3E+c_4W+c_5P+c_6B$$

The filter coefficients $c_i$ are calculated by minimising MSE between predicted and reconstructed chroma samples in the reference area. FIG. 7 illustrates an example of the reference area which consists of 6 lines of chroma samples above and left of the PU. Reference area extends one PU width to the right and one PU height below the PU boundaries. Area is adjusted to include only available samples. The extensions to the area (indicated as "paddings") are needed to support the "side samples" of the plus-shaped spatial filter in FIG. 6 and are padded when in unavailable areas.

The MSE minimization is performed by calculating autocorrelation matrix for the luma input and a cross-correlation vector between the luma input and chroma output. Autocorrelation matrix is LDL decomposed and the final filter coefficients are calculated using back-substitution. The process follows roughly the calculation of the ALF filter coefficients in ECM, however LDL decomposition was chosen instead of Cholesky decomposition to avoid using square root operations.

Also, similarly to CCLM, there is an option of using a single model or multi-model variant of CCCM. The multi-model variant uses two models, one model derived for samples above the average luma reference value and another model for the rest of the samples (following the spirit of the CCLM design). Multi-model CCCM mode can be selected for PUs which have at least 128 reference samples available.

Gradient Linear Model (GLM)

Compared with the CCLM, instead of down-sampled luma values, the GLM utilizes luma sample gradients to derive the linear model. Specifically, when the GLM is applied, the input to the CCLM process, i.e., the down-sampled luma samples L, are replaced by luma sample gradients G. The other parts of the CCLM (e.g., parameter derivation, prediction sample linear transform) are kept unchanged.

$$C=\alpha\cdot G+\beta$$

For signalling, when the CCLM mode is enabled for the current CU, two flags are signalled separately for Cb and Cr components to indicate whether GLM is enabled for each component. If the GLM is enabled for one component, one syntax element is further signalled to select one of 16 gradient filters (810-840 in FIG. 8) for the gradient calculation. The GLM can be combined with the existing CCLM by signalling one extra flag in bitstream. When such combination is applied, the filter coefficients that are used to derive the input luma samples of the linear model are calculated as the combination of the selected gradient filter of the GLM and the down-sampling filter of the CCLM.

Spatial Candidate Derivation

The derivation of spatial merge candidates in VVC is the same as that in HEVC except that the positions of first two merge candidates are swapped. A maximum of four merge candidates ($B_0$, $A_0$, $B_1$ and $A_1$) for current CU 910 are selected among candidates located in the positions depicted in FIG. 9. The order of derivation is $B_0$, $A_0$, $B_1$, $A_1$ and $B_2$. Position $B_2$ is considered only when one or more neighbouring CU of positions $B_0$, $A_0$, $B_1$, $A_1$ are not available (e.g. belonging to another slice or tile) or is intra coded. After candidate at position $A_1$ is added, the addition of the remaining candidates is subject to a redundancy check which ensures that candidates with the same motion information are excluded from the list so that coding efficiency is improved. To reduce computational complexity, not all possible candidate pairs are considered in the mentioned redundancy check. Instead, only the pairs linked with an arrow in FIG. 10 are considered and a candidate is only added to the list if the corresponding candidate used for redundancy check does not have the same motion information.

Temporal Candidates Derivation

In this step, only one candidate is added to the list. Particularly, in the derivation of this temporal merge candidate for a current CU 1110, a scaled motion vector is derived based on the co-located CU 1120 belonging to the collocated reference picture as shown in FIG. 11. The reference picture list and the reference index to be used for the derivation of the co-located CU is explicitly signalled in the slice header. The scaled motion vector 1130 for the temporal merge candidate is obtained as illustrated by the dotted line in FIG. 11, which is scaled from the motion vector 1140 of the co-located CU using the POC (Picture Order Count) distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

The position for the temporal candidate is selected between candidates $C_0$ and $C_1$, as depicted in FIG. 12. If CU at position $C_0$ is not available, is intra coded, or is outside of the current row of CTUs, position $C_1$ is used. Otherwise, position $C_0$ is used in the derivation of the temporal merge candidate.

Non-Adjacent Spatial Candidate

During the development of the VVC standard, a coding tool referred as Non-Adjacent Motion Vector Prediction (NAMVP) has been proposed in JVET-L0399 (Yu Han, et al., "CE4.4.6: Improvement on Merge/Skip mode", Joint Video Exploration Team (JVET) of ITU-T SG 16 WP 3 and ISO/IEC JTC 1/SC 29/WG 11, 12th Meeting: Macao, CN, 3-12 Oct. 2018, Document: JVET-L0399). According to the NAMVP technique, the non-adjacent spatial merge candidates are inserted after the TMVP (i.e., the temporal MVP) in the regular merge candidate list. The pattern of spatial merge candidates is shown in FIG. 13. The distances between non-adjacent spatial candidates and current coding block are based on the width and height of current coding block. In FIG. 13, each small square corresponds to a NAMVP candidate and the candidates are ordered (as shown by the number inside the square) according to the distance.

The line buffer restriction is not applied. In other words, the NAMVP candidates far away from a current block may have to be stored that may require a large buffer.

In the present invention, methods and apparatus to derive cross-component prediction models for non-intra coded blocks to allow inherited cross-component models to propagate are disclosed to improve the performance. In addition, methods and apparatus to use innovative default cross-component candidates are disclosed to improve the coding performance.

BRIEF SUMMARY OF THE INVENTION

A method and apparatus for video coding using inherited cross-component models are disclosed. According to the method, input data associated with a current non-intra mode block comprising a first-colour block and a second-colour block are received, wherein the input data comprise pixel data to be encoded at an encoder side or coded data associated with the current block to be decoded at a decoder side. An inherited cross-component prediction candidate is derived by inheriting one or more cross-component model parameters associated with an inheriting neighbouring block. The inherited cross-component prediction candidate is stored, wherein the inherited cross-component prediction candidate is used in a reconstruction process of a neighbouring block in a subsequent picture. The current block is encoded or decoded using a prediction candidate list comprising the inherited cross-component prediction candidate, wherein when the inherited cross-component prediction candidate is selected from the prediction candidate list, the second-colour block is encoded or decoded by using prediction data generated by applying the inherited cross-component prediction candidate to reconstructed first-colour block.

In one embodiment, the current block corresponds to a uni-direction coded block, and the inheriting neighbouring block corresponds to a reference block in a reference picture located according to a motion vector of the current block and the reference block is intra coded and has cross-component model information. In another embodiment, the reference block is inter coded and inherits cross-component model information from a corresponding reference block of the reference block.

In one embodiment, the current block corresponds to a bi-direction coded block, and the inheriting neighbouring block corresponds to a reference block in one of two reference pictures located according to a motion vector of the current block and the reference block is intra coded and has cross-component model information. In another embodiment, the reference block is inter coded and inherits cross-component model information from a corresponding reference block of the reference block.

In one embodiment, the current block corresponds to a bi-direction coded block, and two reference blocks in two reference pictures are located according respective motion vectors of the current block, and the two reference blocks are intra coded with respective cross-component model information, and wherein the inherited cross-component prediction candidate combines the respective cross-component model information.

According to another method, a prediction candidate list comprising one or more inherited cross-component prediction candidates is determined. A default cross-component prediction candidate is inserted into the prediction candidate list when the prediction candidate list is not full, wherein the default cross-component prediction candidate is generated by using neighbouring reconstructed first-colour samples and second-colour samples of the current block to derive a cross-component model for the default cross-component prediction candidate, or by using partial model parameters or modifying model parameters associated with an earlier candidate to derive the cross-component model for the default cross-component prediction candidate. The current block is encoded or decoded using the prediction candidate list, wherein when the default cross-component prediction candidate is selected from the prediction candidate list, the second-colour block is encoded or decoded by using prediction data generated by applying the default cross-component prediction candidate to reconstructed first-colour block.

In one embodiment, the first-colour block corresponds to a luma block and the second-colour block corresponds to a chroma block, and wherein one or more parameters for the default cross-component prediction candidate are derived using neighbouring reconstructed luma samples and chroma samples of the current block. In one embodiment, the default cross-component prediction candidate corresponds to CCLM_LA, CCLM_L, CCLM_A, MMLM_LA, MMLM_L, MMLM_A, single-model CCCM, multiple-model CCCM or cross-component model with a specified GLM pattern. In one embodiment, a scaling parameter $\alpha$ for the default cross-component prediction candidate derived by using the neighbouring reconstructed luma samples and chroma samples of the current block is updated by adding an offset $\Delta\alpha$. In one embodiment, the offset is selected from a group including $+1/8$, $-1/8$, $+2/8$, $-2/8$, $+3/8$, $-3/8$, $+4/8$ and $-4/8$.

In one embodiment, the default cross-component prediction candidate is generated by copying k model parameters associated with the earlier candidate to derive the cross-component model for the default cross-component prediction candidate, and wherein the earlier candidate has m parameters and both k and m are positive integers and $0<k<m$. In one embodiment, the earlier candidate corresponds to MMLM candidate and the default cross-component prediction candidate corresponds to first model of the MMLM candidate. In another embodiment, the earlier candidate corresponds to MMLM candidate and the default cross-component prediction candidate corresponds to second model of the MMLM candidate. In one embodiment, the earlier candidate corresponds to MMLM candidate and the default cross-component prediction candidate corresponds to a combination of first model and second model of the MMLM candidate.

DETAILED DESCRIPTION OF THE INVENTION

Figure 1A:
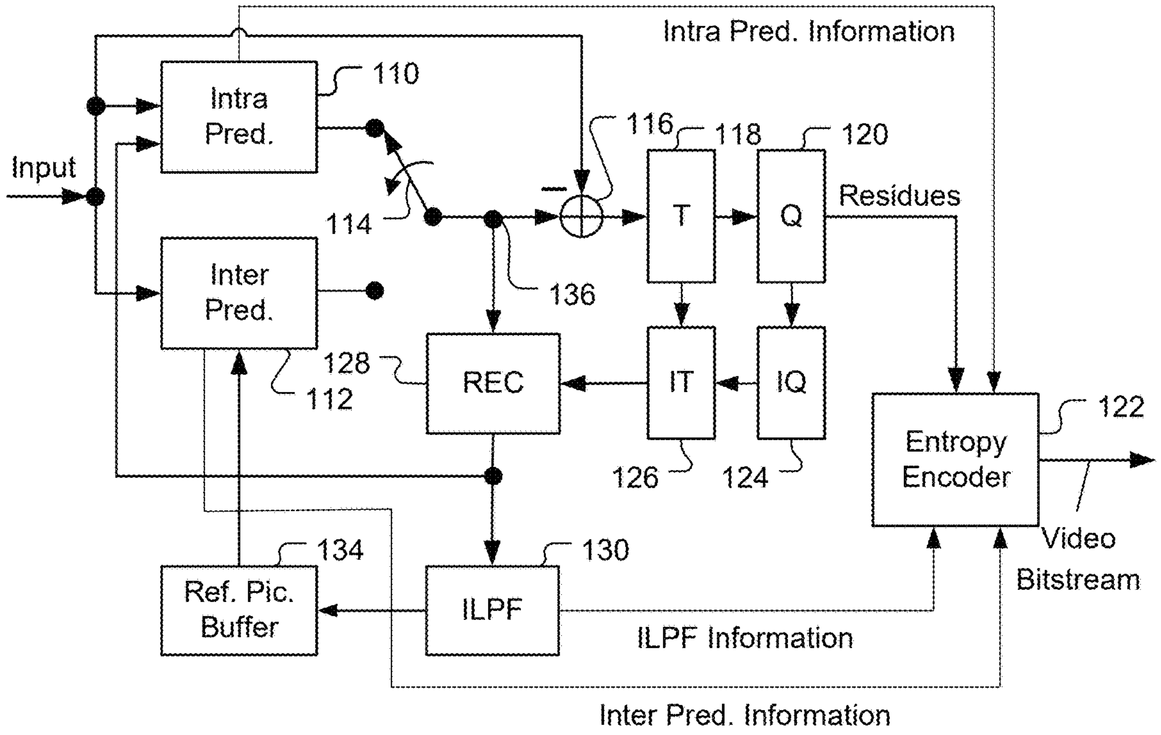
FIG. 1A illustrates an exemplary adaptive Inter/Intra video coding system incorporating loop processing.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In order to improve the prediction accuracy or coding performance of cross-component prediction, various schemes related to inheriting cross-component models are disclosed.

Guided Parameter Set for Refining the Cross-Component Model Parameters

According to this method, the guided parameter set is used to refine the derived model parameters by a specified CCLM mode. For example, the guided parameter set is explicitly signalled in the bitstream, after deriving the model parameters, the guided parameter set is added to the derived model parameters as the final model parameters. The guided parameter set contain at least one of a differential scaling parameter (dA), a differential offset parameter (dB), and a differential shift parameter (dS). For example, equation (1) can be rewritten as:

$$pred_C(i,j) = ((\alpha' \cdot rec'_L(i,j)) \gg s) + \beta,$$

and if dA is signalled, the final prediction is:

$$pred_C(i,j) = (((\alpha' + dA) \cdot rec'_L(i,j)) \gg s) + \beta.$$

Similarly, if dB is signalled, then the final prediction is:

$$pred_C(i,j) = ((\alpha' \cdot rec'_L(i,j)) \gg s) + (\beta + \mathrm{dB}).$$

If dS is signalled, then the final prediction is:

$$pred_C(i,j) = ((\alpha' \cdot rec'_L(i,j)) \gg (s + dS)) + \beta.$$

If dA and dB are signalled, then the final prediction is:

$$pred_C(i,j) = (((\alpha' + dA) \cdot rec'_L(i,j)) \gg s) + (\beta + \mathrm{dB}).$$

The guided parameter set can be signalled per colour component. For example, one guided parameter set is signalled for Cb component, and another guided parameter set is signalled for Cr component. Alternatively, one guided parameter set can be signalled and shared among colour components. The signalled dA and dB can be a positive or negative value. When signalling dA, one bin is signalled to indicate the sign of dA. Similarly, when signalling dB, one bin is signalled to indicate the sign of dB.

For another embodiment, if dA is signalled, dB can be implicitly derived from the average value of neighbouring (e.g. L-shape) reconstructed samples. For example, in VVC, four neighbouring luma and chroma reconstructed samples are selected to derived model parameters. Suppose the average value of neighbouring luma and chroma samples are lumaAvg and chromaAvg, then β is derived by β=chromaAvg−(α'+dA)·lumaAvg. The average value of neighbouring luma samples (i.e., lumaAvg) can be calculated by all selected luma samples, the luma DC mode value of the current luma CB, or the average of the maximum and minimum luma samples $$\text{(e.g., } lumaAvg = (\mathrm{Max}(x_A^0, x_A^1) + \mathrm{Min}(x_B^0, x_B^1) + 1) \gg 1, \quad \text{or } lumaAvg = (\mathrm{Min}(x_A^0, x_A^1) + \mathrm{Max}(x_B^0, x_B^1) + 1) \gg 1).$$

Similarly, average value of neighbouring chroma samples (i.e., chromaAvg) can be calculated by all selected chroma samples, the chroma DC mode value of the current chroma CB, or the average of the maximum and minimum chroma samples $$\text{(e.g., } chromaAvg = (\mathrm{Max}(y_A^0, y_A^1) + \mathrm{Min}(y_B^0, y_B^1) + 1) \gg 1, \quad \text{or } chromaAvg = (\mathrm{Min}(y_A^0, y_A^1) + \mathrm{Max}(y_B^0, y_B^1) + 1) \gg 1).$$

Note, for non-4:4:4 colour subsampling format, the selected neighbouring luma reconstructed samples can be from the output of CCLM downsampling process.

For another embodiment, the shift parameter, s, can be a constant value (e.g., s can be 3, 4, 5, 6, 7, or 8), and dS is equal to 0 and no need to be signalled.

For another embodiment, in MMLM, the guided parameter set can also be signalled per model. For example, one guided parameter set is signalled for one model and another guided parameter set is signalled for another model. Alternatively, one guided parameter set is signalled and shared among linear models. Or only one guided parameter set is signalled for one selected model, and another model is not further refined by guided parameter set.

Inherit Neighbouring Model Parameters for Refining the Cross-Component Model Parameters The final scaling parameter of the current block is inherited from the neighbouring blocks and further refined by dA (e.g., dA derivation or signalling can be similar or the same as the method in the previous "Guided parameter set for refining the cross-component model parameters"). Once the final scaling parameter is determined, the offset parameter (e.g., β in CCLM) is derived based on the inherited scaling parameter and the average value of neighbouring luma and chroma samples of the current block. For example, if the final scaling parameter is inherited from a selected neighbouring block, and the inherited scaling parameter is $\alpha'_{nei}$, then the final scaling parameter is ($\alpha'_{nei}$+dA). For yet another embodiment, the final scaling parameter is inherited from a historical list and further refined by dA. For example, the historical list records the most recent j entries of final scaling parameters from previous CCLM-coded blocks. Then, the final scaling parameter is inherited from one selected entry of the historical list, $\alpha'_{list}$, and the final scaling parameter is ($\alpha'_{list}$+dA). For yet another embodiment, the final scaling parameter is inherited from a historical list or the neighbouring blocks, but only the MSB (Most Significant Bit) part of the inherited scaling parameter is taken, and the LSB (Least Significant Bit) of the final scaling parameter is from dA. For yet another embodiment, the final scaling parameter is inherited from a historical list or the neighbouring blocks, but does not further refine by dA.

For yet another embodiment, after inheriting model parameters, the offset can be further refined by dB. For example, if the final offset parameter is inherited from a selected neighbouring block, and the inherited offset parameter is $\beta'_{nei}$, then the final offset parameter is ($\beta'_{nei}$+dB). For still another embodiment, the final offset parameter is inherited from a historical list and further refined by dB. For example, the historical list records the most recent j entries of final offset parameters from previous CCLM-coded blocks. Then, the final offset parameter is inherited from one selected entry of the historical list, $\beta'_{list}$, and the final offset parameter is ($\beta'_{list}$+dB). For yet another embodiment, if the inherited neighbour block is coded with CCCM, the filter coefficients ($c_i$) are inherited. The offset parameter (e.g., $c_6 \times B$ or $c_6$ in CCCM) can be re-derived based on the inherited parameter and the average value of neighbouring corresponding position luma and chroma samples of the current block. For still another embodiment, only partial filter coefficients are inherited (e.g., only n out of 6 filter coefficients are inherited, where $1 \le n < 6$), the rest filter coefficients are further re-derived using the neighbouring luma and chroma samples of the current block.

For still another embodiment, if the inherited candidate applies GLM gradient pattern to its luma reconstructed samples, the current block shall also inherit the GLM gradient pattern of the candidate and apply to the current luma reconstructed samples.

For still another embodiment, if the inherited neighbour block is coded with multiple cross-component models (e.g., MMLM, or CCCM with multi-model), the classification threshold is also inherited to classify the neighbouring samples of the current block into multiple groups, and the inherited multiple cross-component model parameters are further assigned to each group. For yet another embodiment, the classification threshold is the average value of the neighbouring reconstructed luma samples, and the inherited multiple cross-component model parameters are further assigned to each group. Similarly, once the final scaling parameter of each group is determined, the offset parameter of each group is re-derived based on the inherited scaling parameter and the average value of neighbouring luma and chroma samples of each group of the current block. For another example, if CCCM with multi-model is used, once the final coefficient parameter of each group is determined (e.g., $c_0$ to $c_5$ except for $c_6$ in CCCM), the offset parameter (e.g., $c_6 \times B$ or $c_6$ in CCCM) of each group is re-derived based on the inherited coefficient parameter and the neighbouring luma and chroma samples of each group of the current block.

For still another embodiment, inheriting model parameters may depend on the colour component. For example, Cb and Cr components may inherit model parameters or model derivation method from the same candidate or different candidates. For yet another example, only one of colour components inherits model parameters, and the other colour component derives model parameters based on the inherited model derivation method (e.g., if the inherit candidate is coded by MMLM or CCCM, the current block also derives model parameters based on MMLM or CCCM using the current neighbouring reconstructed samples). For still another example, only one of colour components inherits model parameters, and the other colour component derives its model parameters using the current neighbouring reconstructed samples.

For still another example, if Cb and Cr components can inherit model parameters or model derivation method from different candidates. The inherited model of Cr can depend on the inherited model of Cb. For example, possible cases include but not limited to (1) if the inherited model of Cb is CCCM, the inherited model of Cr shall be CCCM; (2) if the inherit model of Cb is CCLM, the inherit model of Cr shall be CCLM; (3) if the inherited model of Cb is MMLM, the inherited model of Cr shall be MMLM; (4) if the inherited model of Cb is CCLM, the inherited model of Cr shall be CCLM or MMLM; (5) if the inherited model of Cb is MMLM, the inherited model of Cr shall be CCLM or MMLM; (6) if the inherited model of Cb is GLM, the inherited model of Cr shall be GLM.

For yet another embodiment, after decoding a block, the (CCM) information cross-component model of the current block is derived and stored for later reconstruction process of neighbouring blocks using inherited neighbours model parameter. The CCM information mentioned in this disclosure includes but not limited to prediction mode (e.g., CCLM, MMLM, CCCM), GLM pattern index, model parameters, or classification threshold. For example, even the current block is coded by inter prediction, the cross-component model parameters of the current block can be derived by using the current luma and chroma reconstruction or prediction samples. Later, if another block is predicted by using inherited neighbours model parameters, it can inherit the model parameters from the current block. For another example, the current block is coded by cross-component prediction, the cross-component model parameters of the current block are re-derived by using the current luma and chroma reconstruction or prediction samples. For another example, the stored cross-component model can be CCCM, LM_LA (i.e., single model LM using both above and left neighbouring samples to derive model), or MMLM_LA (multi-model LM using both above and left neighbouring samples to derive model). For still example, even the current block is coded by non-cross-component intra prediction (e.g., DC, planar, intra angular modes, MIP, or ISP), the cross-component model parameters of the current block are derived by using the current luma and chroma reconstruction or prediction samples.

For still another example, when the current slice is a non-intra slice (e.g., P slice or B slice), a cross-component model of the current block is derived and stored for later reconstruction process of neighbouring blocks using inherited neighbours model parameter. For still another embodiment, when the current block is inter-coded, the CCM information of the current inter-coded block is derived by copying the CCM information from its reference block that has CCM information in a reference picture, located by the motion information of the current inter-coded block. For example, as shown in the FIG. 14, the block B in a P/B picture 1420 is inter-coded, then the CCM information of block B is obtained by copying CCM information from its referenced block A in an I picture 1410. It should be noted that the current block can also copy the CCM information from an intra-coded block in an P/B picture. For example, as shown in the FIG. 14, the block D in a P/B picture 1430 is inter-coded, then the CCM information of block D is obtained by copying CCM information from its referenced block E that is intra-coded in the P/B picture 1420. For still another embodiment, if the reference block in a reference picture is also inter-coded, the CCM information of the reference block is obtained by copying the CCM information from another reference block in another reference picture. For example, as shown in the FIG. 14, the current block C in a current P/B picture 1430 is inter-coded and its referenced block B is also inter-coded, due to the CCM information of block B is obtained by copying the CCM information from block A, then the CCM information of block A is also propagated to the current block C. For still another embodiment, when the current block is inter-coded with bi-directional prediction, if one of its reference blocks is intra-coded and has CCM information, the CCM information of the current block is obtained by copying the CCM information from its intra-coded reference block in a reference picture. For example, suppose block F is inter-coded with bi-prediction and has reference blocks G and H. Block G is intra-coded and has CCM information. The CCM information of block F is obtained by copying the CCM information from the block G coded in CCM mode. For still another embodiment, when the current block is inter-coded with bi-directional prediction, the CCM information of the current block is the combination of the CCM models of its reference blocks (as the method mentioned in section entitled: Inheriting multiple cross-component models).

Inherit Spatial Neighbouring Model Parameters

For another embodiment, the inherited model parameters could be from a block that is an immediate neighbouring block. The models from blocks at pre-defined positions are added into the candidate list in a pre-defined order. For example, the pre-defined positions could be the positions depicted in FIG. 14, and the pre-defined order could be $B_0$, $A_0$, $B_1$, $A_1$ and $B_2$, or $A_0$, $B_0$, $B_1$, $A_1$ and $B_2$.

For still another embodiment, the pre-defined positions include the positions at the immediate above (W>>1) or ((W>>1)−1) position if W is greater than or equal to TH, and the positions at the immediate left (H>>1) or ((H>>1)−1) position if H is greater than or equal to TH, where W and H are the width and height of the current block, TH is a threshold value which could be 4, 8, 16, 32, or 64.

Figure 14:
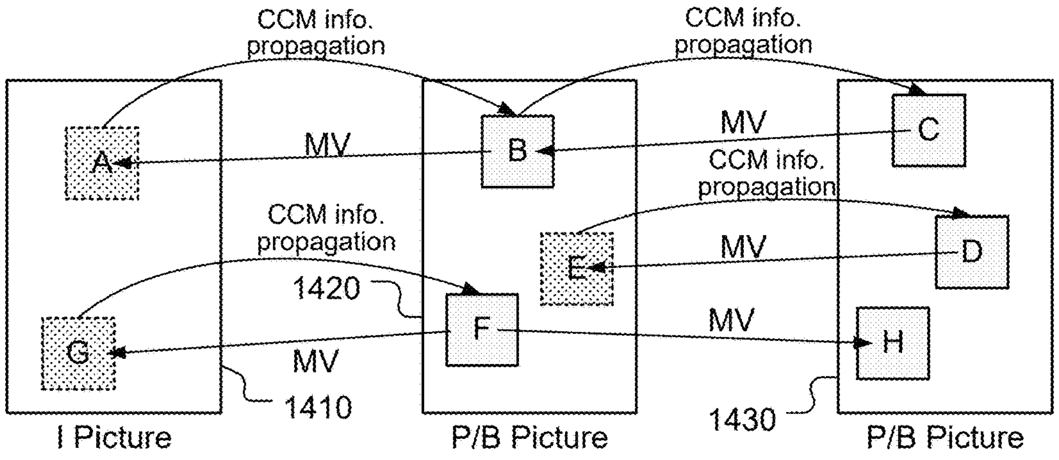
FIG. 14 illustrates examples of CCM information propagation, where the blocks with dash line (i.e., A, E, G) are coded in cross-component mode (e.g., CCLM, MMLM, GLM, CCCM).

For still another embodiment, the maximum number of inherited models from spatial neighbours are smaller than the number of pre-defined positions. For example, if the pre-defined positions are as depicted in FIG. 14, there are 5 pre-defined positions. If pre-defined order is $B_0$, $A_0$, $B_1$, $A_1$ and $B_2$, and the maximum number of inherited models from spatial neighbours is 4, the model from B2 is added into the candidate list only when one of preceding blocks is not available or is not coded in cross-component model.

Inheriting Temporal Neighbouring Model Parameters

Figure 15:
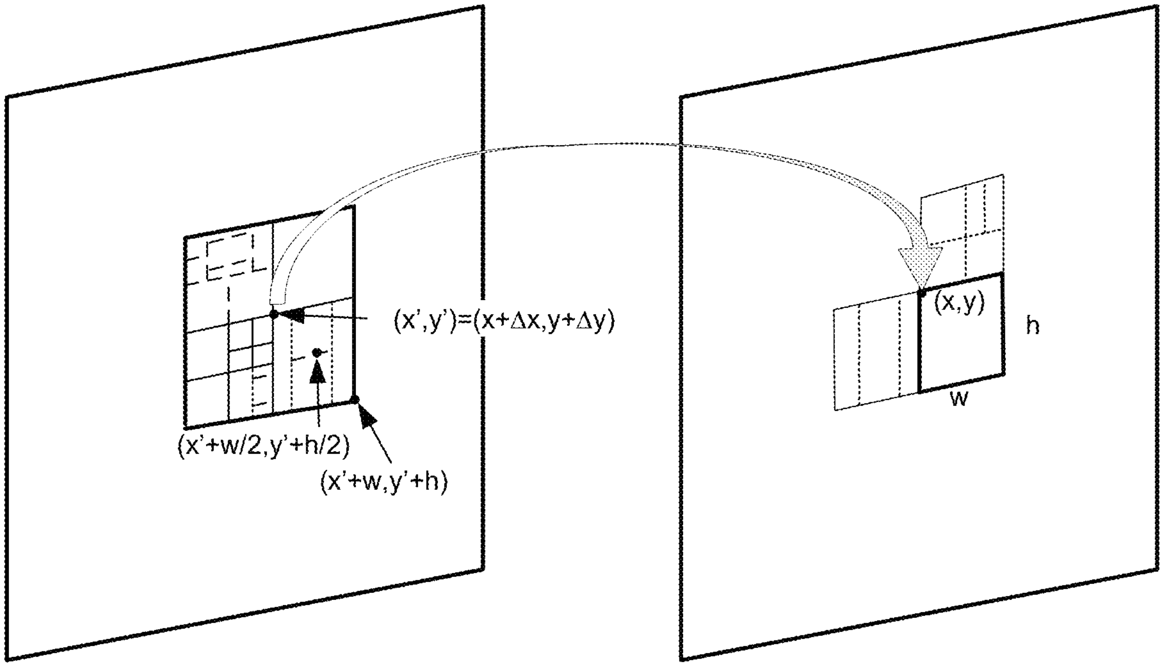
FIG. 15 illustrates an example of inheriting temporal neighbouring model parameters.

For still another embodiment, if the current slice/picture is a non-intra slice/picture, the inherited model parameters can be from the block in the previous coded slices/pictures. For example, as shown in the FIG. 15, the current block position is at (x, y) and the block size is w×h. The inherited model parameters can be from the block at position (x', y'), (x', y'+h/2), (x'+w/2, y'), (x'+w/2, y'+h/2), (x'+w, y'), (x', y'+h), or (x'+w, y'+h) of the previous coded slices/picture, where x'=x+Δx and y'=y+Δy. In one embodiment, if the prediction mode of the current block is intra, Δx and Δy are set to 0. If the prediction mode of the current block is inter prediction, Δx and Δy are set to the horizontal and vertical motion vector of the current block. In another embodiment, if the current block is inter bi-prediction, Δx and Δy are set to the horizontal and vertical motion vectors in reference picture list 0. In still another embodiment, if the current block is inter bi-prediction, Δx and Δy are set to the horizontal and vertical motion vectors in reference picture list 1.

For still another embodiment, if the current block is inter bi-prediction, the inherited model parameters can be from the block in the previous coded slices/pictures in the reference lists. For example, if the horizontal and vertical motion vector in reference picture list 0 is $\Delta x_{L0}$ and $\Delta y_{L0}$, the motion vector can be scaled to other reference pictures in the reference list 0 and 1. If the motion vector is scaled to the $i^{th}$ reference picture in the reference list 0 as ($\Delta x_{L0,i0}$, $\Delta y_{L0,i0}$), the model can be from the block in the $i^{th}$ reference picture in the reference list 0, and Δx and Δy are set to ($\Delta x_{L0,i0}$, $\Delta y_{L0,i0}$). For another example, if the horizontal and vertical motion vector in reference picture list 0 is $\Delta x_{L0}$ and $\Delta y_{L0}$ and the motion vector is scaled to the $i^{th}$ reference picture in the reference list 1 as ($\Delta x_{L0,i1}$, $\Delta y_{L0,i1}$), the model can be from the block in the $i^{th}$ reference picture in the reference list 1, and Δx and Δy are set to ($\Delta x_{L0,i1}$, $\Delta y_{L0,i1}$)

Inherit Non-Adjacent Spatial Neighbouring Models

Figure 13:
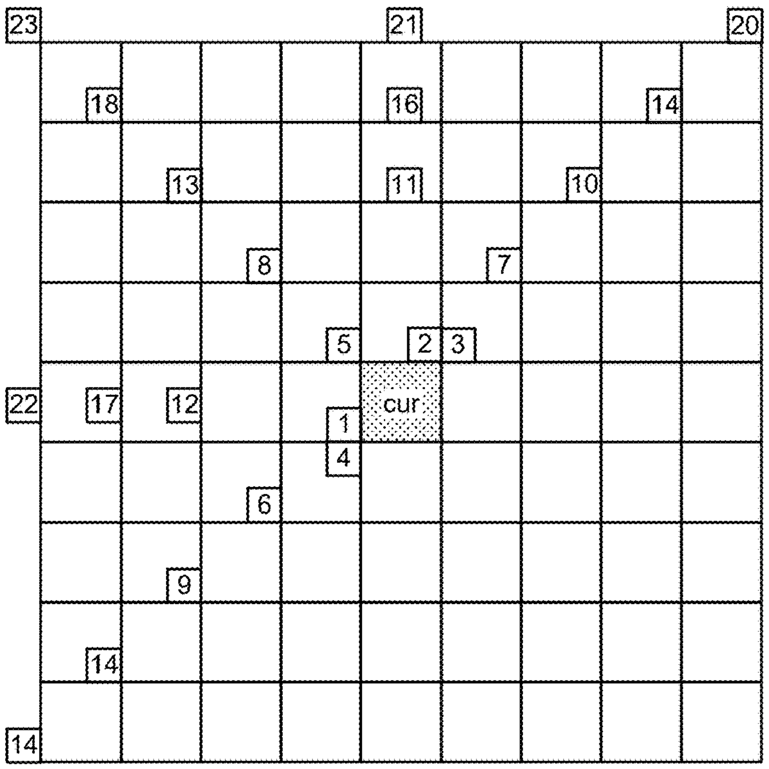
FIG. 13 illustrates an exemplary pattern of the non-adjacent spatial merge candidates.

For another embodiment, the inherited model parameters can be from blocks that are spatial neighbouring blocks. The models from blocks at pre-defined positions are added into the candidate list in a pre-defined order. For example, the pattern of the positions and order can be as the pattern depicted in FIG. 13, where the distance between each position is the width and height of current coding block. For another embodiment, the distance between the positions that are closer to the current encoding block is smaller than the positions that are further away from the current block.

Figure 16A:
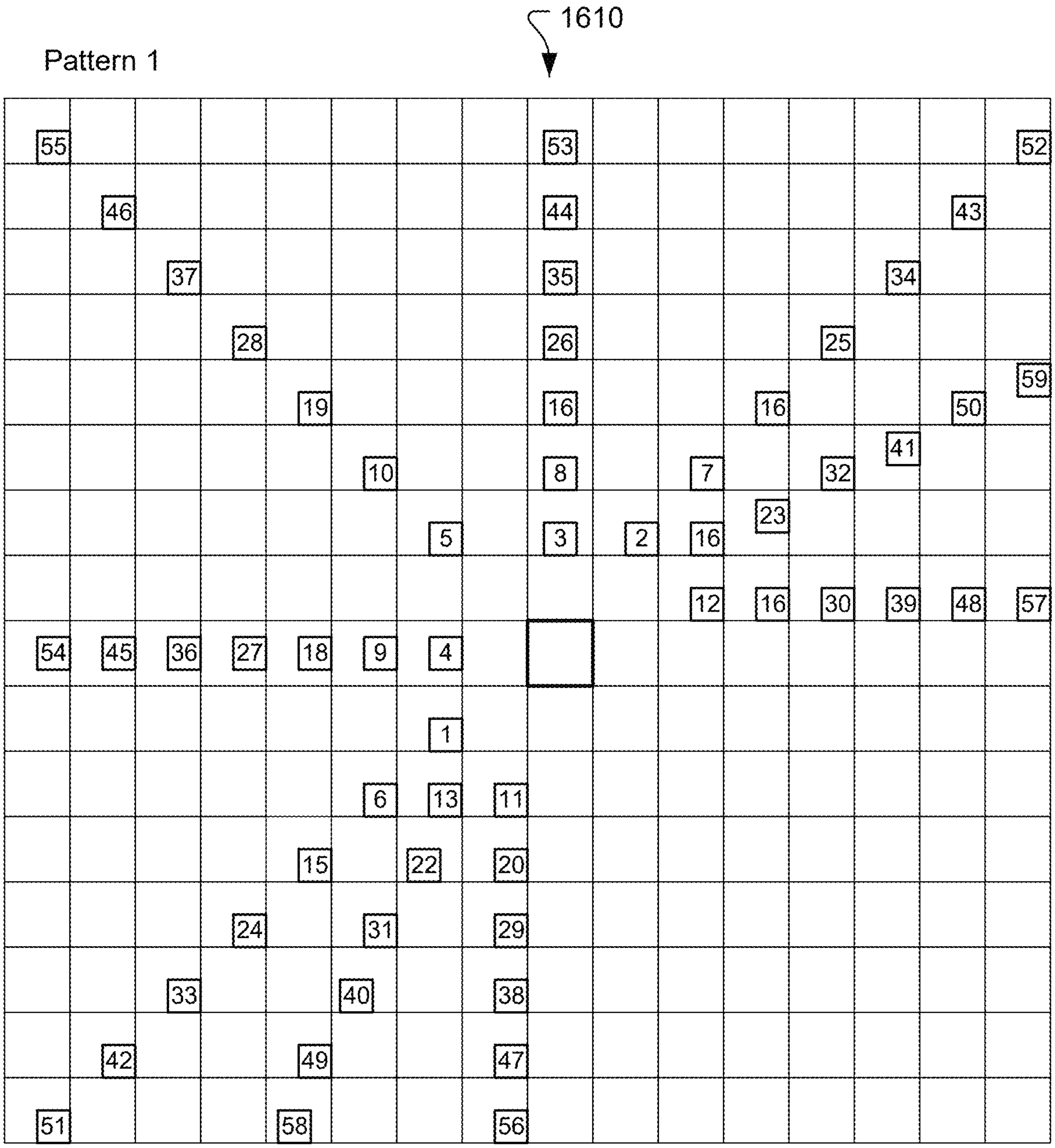
FIGS. 16A-B illustrates two search patterns for inheriting non-adjacent spatial neighbouring models.
Figure 16B:
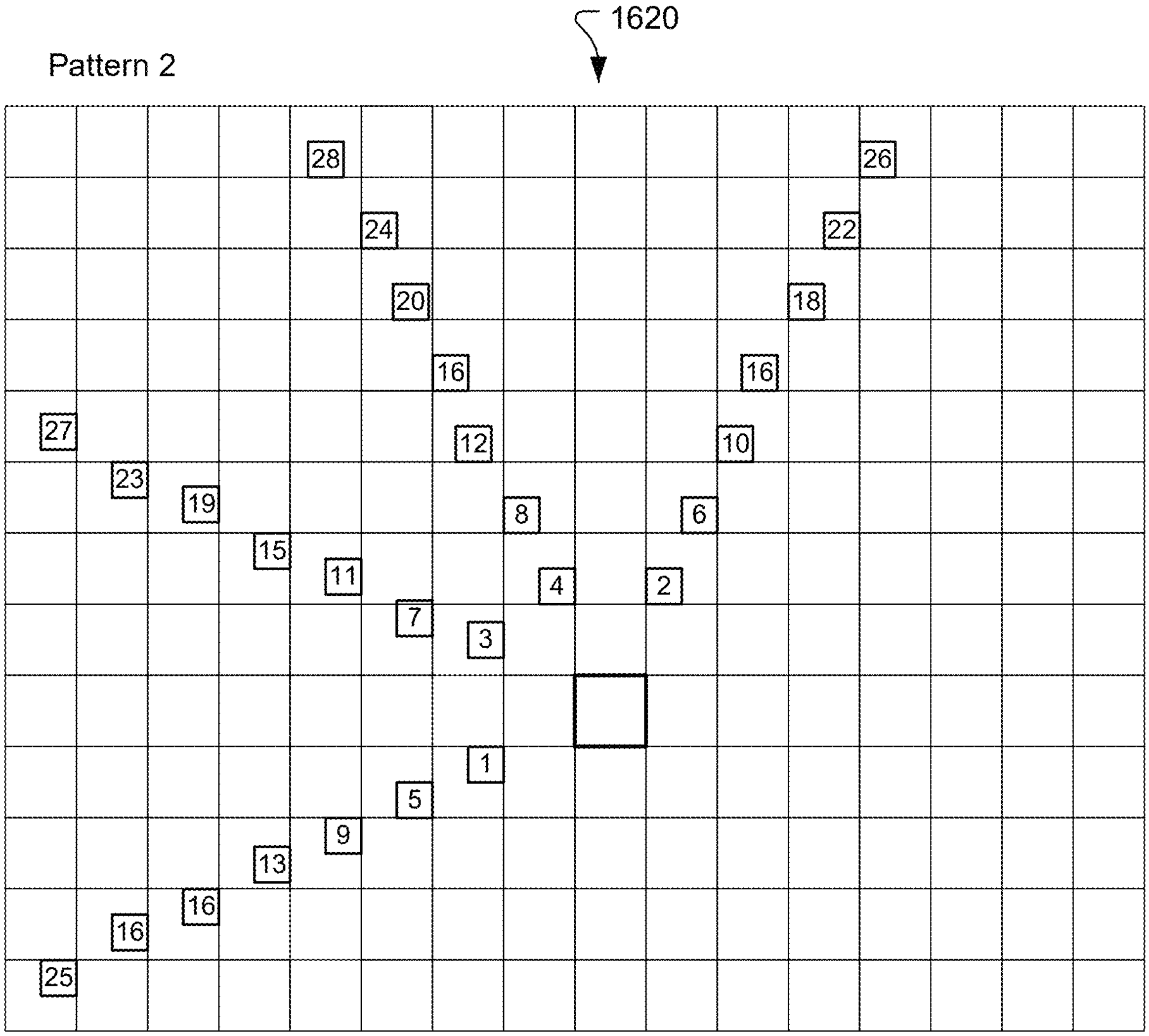

For still another embodiment, the maximum number of inherited models from non-adjacent spatial neighbours are smaller than the number of pre-defined positions. For example, if the pre-defined positions are as depicted in FIGS. 16A-B, where two patterns (1610 and 1620) are shown. If the maximum number of inherited models from non-adjacent spatial neighbours is N, the search pattern 2 is used only when the number of available models from search pattern 1 is smaller than N.

The Available Region of Non-Adjacent Spatial Candidates

To limit the requirement buffer/storage resource, the available range for including non-adjacent spatial candidates should be constrained. In one embodiment, only the cross-component model (CCM) information in the current CTU can be referenced by the non-adjacent spatial candidate. In another embodiment, only the CCM information in the current CTU or left M CTUs can be referenced by the non-adjacent spatial candidate. M can be any integer larger than 0. In another embodiment, only the CCM information in the current CTU row can be referenced by the non-adjacent spatial candidate. In another embodiment, only the to-be referenced position within the current CTU row or above N CTU rows can be referenced. N can be any integer larger than 0. Note, the CCM information mentioned in this disclosure includes but is not limited to prediction mode (e.g., CCLM, MMLM, CCCM), GLM pattern index, model parameters, or classification threshold.

In another embodiment, the CCM information in the current CTU, the current CTU row, the current CTU row+above N CTU rows, the current CTU+left M CTUs, or the current CTU+above N CTU rows+left M CTUs can be referenced without limits. Furthermore, the CCM information in other regions can only be referenced by a larger pre-defined unit. For example, the CCM information in the current CTU row is stored within a 4×4 grid, and for other CCM information outside the current CTU row is stored within a 16×16 grid. In other words, one 16×16 region only needs to store one CCM information, so the to-be referenced position shall be rounded to the 16×16 grid, or changed to the nearest position of 16×16 grid.

Figure 17:
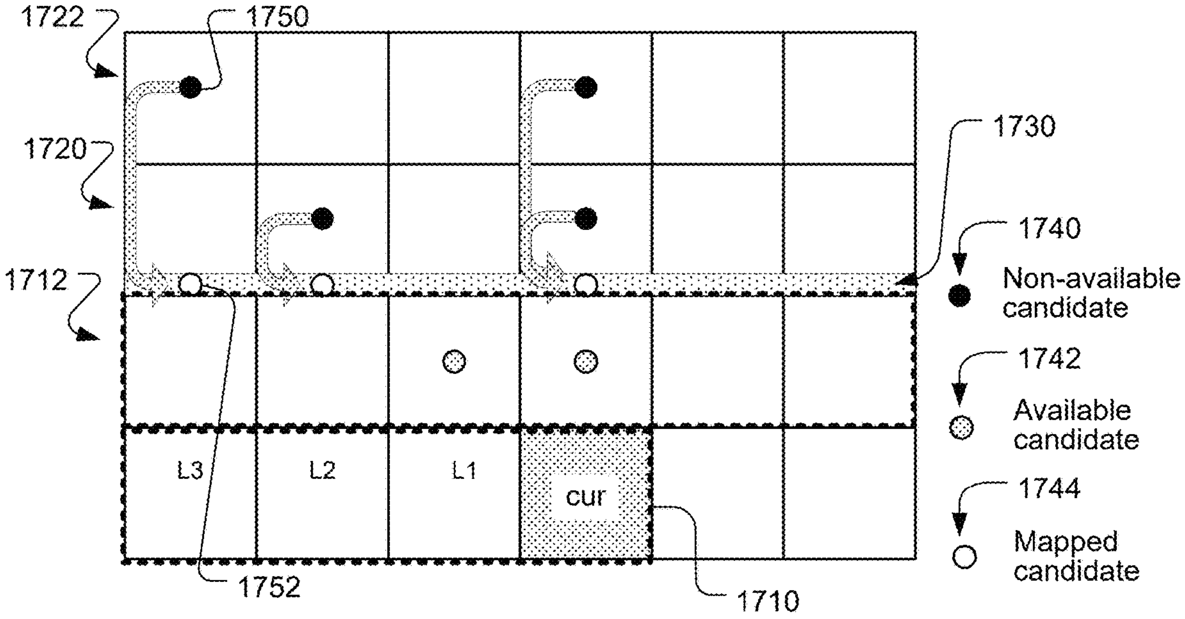
FIG. 17 illustrates an example to map motion information for the to-be referenced positions in a non-available region to pre-defined positions, where the pre-defined positions are located at one line above the above-first CTU row.

In another embodiment, the CCM information in the current CTU row, or the current CTU row+M CTU rows can be referenced without limits, and for the to-be referenced positions in the above CTU row, the positions will be mapped to one line above of current CTU, or the current CTU row+M CTU rows for referencing. This design can preserve most of the coding efficiency and doesn't increase buffer by much for storing the CCM information of above CTU rows. For example, the CCM information in the current CTU row (1710) and the first CTU row above (1712) can be referenced without limits; and for the to-be referenced positions in the above-second (1720), above-third (1722), above-fourth CTU row, and so on, the positions will be mapped to one line (1730) above the above-first CTU row (as shown in FIG. 17). In FIG. 17, a dark circle indicates a non-available candidate 1740, an empty circle indicates an available candidate 1742 and a dot-filled circle indicates a non-available candidate 1744. For example, the non-available candidate 1750 in the above-second (1720) CTU row is mapped to an available candidate 1752 in one line (1730) above the above-first CTU row (1724).

In the above example, the region that can be referenced without limits is close to the current CTU (e.g. the current CTU row or the above-first CTU row). However, the region according to the present invention is not limited to the exemplary region shown above. The region can be larger or smaller than the example shown above. In general, the region can be limited to be within one or more pre-define distances in a vertical direction, a horizontal direction or both from the current CTU. In the above example, the region is limited to 1 CTU height in the above vertical direction, which can be extended to 2 or 3 CTU heights if desired. In the case that left M CTUs are used, the limit is M CTU width for the current CTU row. The horizontal position of a to-be referenced position and the horizontal position of a mapped pre-defined position can be the same (e.g. position 1750 and position 1752 in the same horizontal position). However, other horizontal position may also be used.

Figure 18:
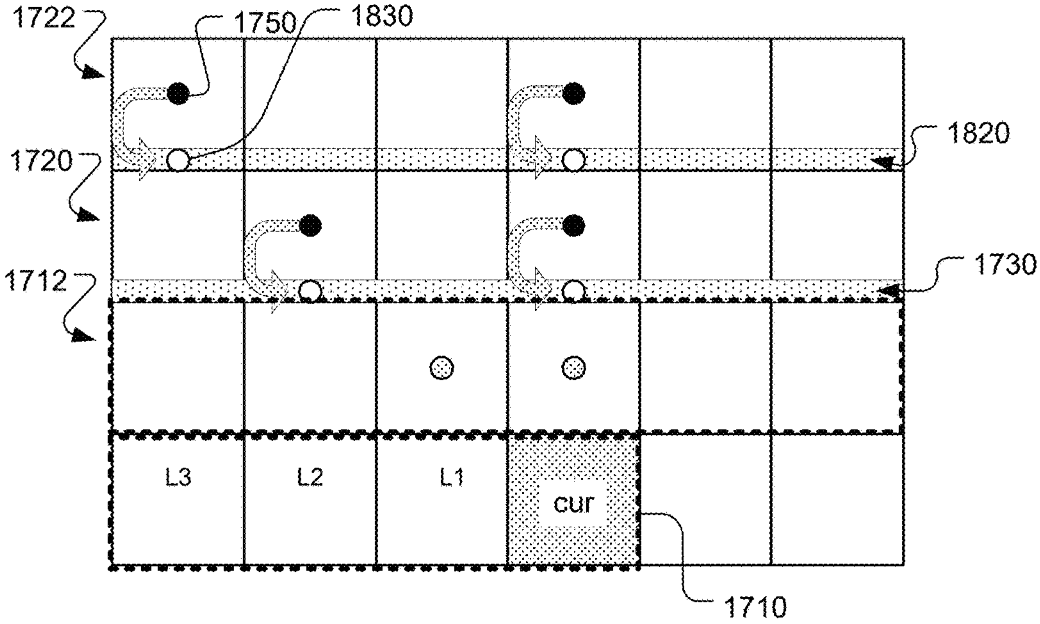
FIG. 18 illustrates an example to map motion information for the to-be referenced positions in a non-available region to pre-defined positions, where the pre-defined positions are located at the bottom line of respective CTU rows.

In another embodiment, the CCM information in the current CTU row, or the current CTU row+M CTU rows can be referenced without limits. Furthermore, for the to-be referenced positions in the above CTU row, the positions will be mapped to the last line of the corresponding CTU row for referencing. For example, as shown in FIG. 18, the CCM information in the current CTU row (1710) and the first CTU row (1712) above can be referenced without limits, and for the to-be referenced positions in the above-second CTU row (1720), the positions will be mapped to the bottom line (1730) of the above-second CTU row (1720). For the to-be referenced positions in above third CTU row (1722), the positions will be mapped to the bottom line (2320) of the above-third CTU row (1722). For example, the non-available candidate 1750 in the above-third CTU row (1722) is mapped to a mapped candidate 1830 in the bottom line (2320) of the above-third CTU row (1722). The legend for the candidate types (i.e., 1740, 1742 and 1744) of FIG. 18 is the same as that in FIG. 17. In this example, the unconstrained region may include one or more above CTU rows (e.g., 1 CTU in FIG. 18). The above-second CTU row is above the unconstrained region. The above-third CTU row is also referred as an above-above CTU row since it is above the CTU row (i.e., the above-second CTU row) above the unconstrained region.

Figure 19:
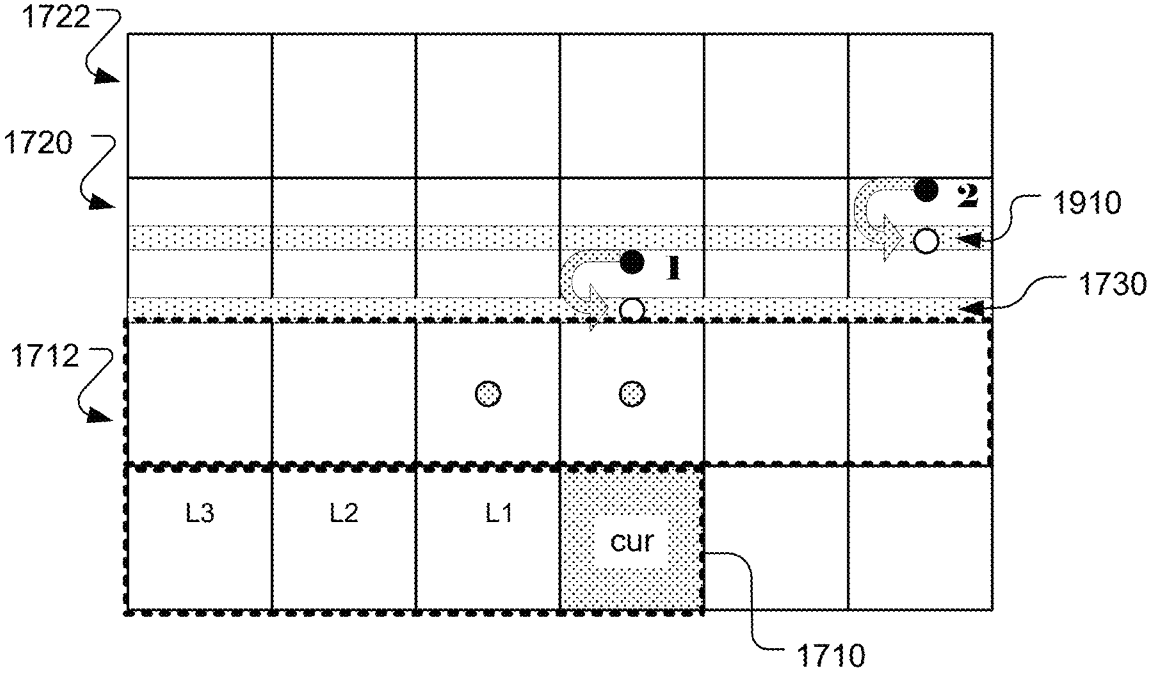
FIG. 19 illustrates an example to map motion information for the to-be referenced positions in a non-available region to pre-defined positions, where the pre-defined positions are located at the bottom line or the centre line of respective CTU rows.

In another embodiment, the CCM information in the current CTU row, or the current CTU row+M CTU rows can be referenced without limits, and for the to-be referenced positions in above CTU row, the positions will be mapped to the last line or bottom line or centre line of the corresponding CTU row for referencing depending on the position of the to-be referenced CCM information. For example, as shown in FIG. 19, the CCM information in the current CTU row (1710) and the above-first CTU row (1712) can be referenced without limits, and for the to-be referenced position 1 in above-second CTU row (1720), the positions will be mapped to the bottom line (1730) of the above-second CTU row before referring. However, for the to-be referenced position 2 in above-second CTU row, the positions will be mapped to the centre line (1910) of the above-second CTU row (1720) before referring since it is closer to the centre line (1910) compared with bottom line (1730). The legend for the candidate types (i.e., 1740, 1742 and 1744) of FIG. 19 is the same as that in FIG. 17.

Figure 20:
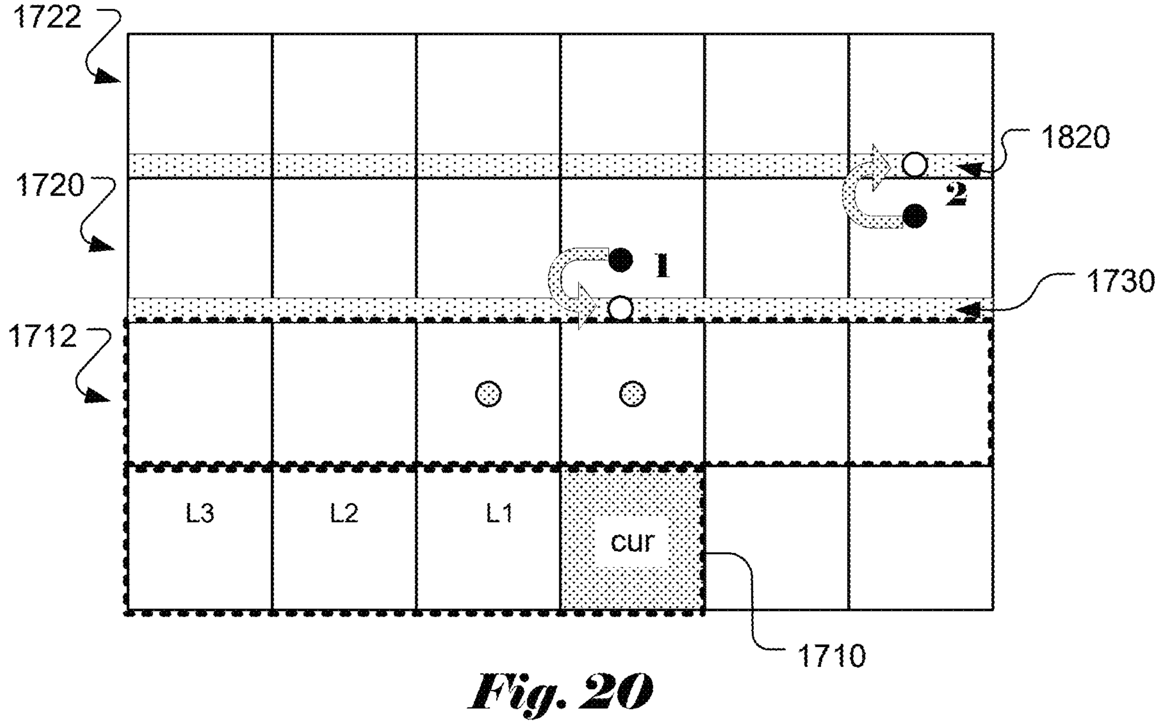
FIG. 20 illustrates an example to map motion information for the to-be referenced positions in a non-available region to pre-defined positions, where the pre-defined positions are located at the bottom line of respective CTU rows or one CTU row above the respective CTU rows.

In another embodiment, the CCM information in the current CTU row, or the current CTU row+M CTU rows can be referenced without limits, and for the to-be referenced positions in the above CTU row, the positions will be mapped to the last line or bottom line of the corresponding CTU row for referencing depending on the position of the to-be referenced CCM information. For example, as shown in FIG. 20, the CCM information in the current CTU row (1710) and the above-first CTU row (1712) can be referenced without limits, and for the to-be referenced position 1 in the above-second CTU row (1720), the positions will be mapped to the bottom line (1730) of the above-second CTU row (1720) before referring. However, for the to-be referenced position 2 in the above-second CTU row (1720), the positions will be mapped to the bottom line (2320) of the above-third CTU row (1722) before referring since it is closer to the bottom line (2320) of the above-third CTU row compared with bottom line (1730) of the above-second CTU row as shown in FIG. 20. The legend for the candidate types (i.e., 1740, 1742 and 1744) is the same as that in FIG. 17.

In another embodiment, the CCM information in the current CTU, or the current CTU+N left CTU can be referenced without limits, and for the left CTUs, the to-be referenced positions will be mapped to the very right line closest to the current CTU, or the current CTU+N left CTU. For example, the CCM information in the current CTU and first left CTU can be referenced without limits, and if the to-be referenced positions are in the second left CTU, the positions will be mapped to one line left to the first left CTU. If the to-be referenced positions are in the third left CTU, the positions will be mapped to one line left to first left CTU. For example, the CCM information in the current CTU and the first left CTU can be referenced without limits, and if the to-be referenced positions are in the second left CTU, the positions will be mapped to the very right line of the second left CTU. If the to-be referenced positions are in the third left CTU, the positions will be mapped to the very right line to the third left CTU.

In another embodiment, when the available range for including non-adjacent candidates is constrained, if the position of a non-adjacent candidate is outside of the available range, that candidate is skipped and will not be inserted into the candidate list. The available region can be the current CTU, current CTU row, current CTU row+above N CTU rows, current CTU+left M CTUs, or current CTU+above N CTU rows+left M CTUs.

Models Generated Based on Other Inherited Models

In another embodiment, a single cross-component model can be generated from a multiple cross-component model. For example, if a candidate is coded with multiple cross-component models (e.g., MMLM, or CCCM with multi-model), a single cross-component model can be generated by selecting the first or the second cross-component model in the multi cross-component models.

Candidate List Construction

In one embodiment, the candidate list is constructed by adding candidates in a pre-defined order until the maximum candidate number is reached. The candidates added may include all or some of the aforementioned candidates, but not limited to the aforementioned candidates. For example, the candidate list may include spatial neighbouring candidates, temporal neighbouring candidate, historical candidates, non-adjacent neighbouring candidates, single model candidates generated based on other inherited models or combined model (as mentioned later in section entitled: Inheriting multiple cross-component models). For another example, the candidate list could include the same candidates as previous example, but the candidates are added into the list in a different order.

In another embodiment, if all the pre-defined neighbouring and historical candidates are added but the maximum candidate number is not reached, some default candidates are added into the candidate list until the maximum candidate number is reached.

In one sub-embodiment, the default candidates include but not limited to the candidates described below. The final scaling parameter $\alpha$ is from the set {0, 1/8, −1/8, +2/8, −2/8, +3/8, −3/8, +4/8, −4/8}, and the offset parameter $\beta=1/(1<<\text{bit\_depth})$ or is derived based on neighbouring luma and chroma samples. For example, if the average value of neighbouring luma and chroma samples are lumaAvg and chromaAvg, then $\beta$ is derived by $\beta=\text{chromaAvg}-\sigma\cdot\text{lumaAvg}$. The average value of neighbouring luma samples (lumaAvg) can be calculated by all selected luma samples, the luma DC mode value the current luma CB, or the average of the maximum and minimum luma samples $$\left(\text{e.g., } lumaAvg = \left(\text{Max}\left(x_A^0, x_A^1\right) + \text{Min}\left(x_B^0, x_B^1\right) + 1\right) \gg 1 = \text{ or } lumaAvg = \left(\text{Min}\left(x_A^0, x_A^1\right) + \text{Max}\left(x_B^0, x_B^1\right) + 1\right) \gg 1\right).$$

Similarly, average value of neighbouring chroma samples (chromaAvg) could be calculated by all selected chroma samples, the chroma DC mode value the current chroma CB, or the average of the maximum and minimum chroma samples $$\left(\text{e.g., } chromaAvg = \left(\text{Max}\left(y_A^0, y_A^1\right) + \text{Min}\left(y_B^0, y_B^1\right) + 1\right) \gg 1, \text{ or } chromaAvg = \left(\text{Min}\left(y_A^0, y_A^1\right) + \text{Max}\left(y_B^0, y_B^1\right) + 1\right) \gg 1\right).$$

In another sub-embodiment, the default candidates include but not limited to the candidates described below. The default candidates are $\alpha\cdot G+\beta$, where G is the luma sample gradients instead of down-sampled luma samples L. The 16 GLM filters described in the section, entitled Gradient Linear Model (GLM), are applied. The final scaling parameter $\alpha$ is from the set {0, 1/8, −1/8, +2/8, −2/8, +3/8, −3/8, +4/8, −4/8}. The offset parameter β=1/(1<<bit_depth) or is derived based on neighbouring luma and chroma samples.

In another embodiment, a default candidate could be an earlier candidate with a delta scaling parameter refinement. For example, if the scaling parameter of an earlier candidate is α, the scaling parameter of a default candidate is (α+Δα) where Δα can be 1/8, −1/8, +2/8, −2/8, +3/8, −3/8, +4/8, −4/8. And the offset parameter of a default candidate would be derived by (α+Δα) and the average value of neighbouring luma and chroma samples of the current block.

Removing or Modifying Similar Neighbouring Model Parameters

When inheriting cross-component model parameters from other blocks, it can further check the similarity between the inherited model and the existing models in the candidate list or those model candidates derived by the neighbouring reconstructed samples of the current block (e.g., models derived by CCLM, MMLM, or CCCM using the neighbouring reconstructed samples of the current block). If the model of a candidate parameter is similar to the existing models, the model will not be included in the candidate list. In one embodiment, it can compare the similarity of (α×lumaAvg+β) or a among existing candidates to decide whether to include the model of a candidate or not. For example, if the (α×lumaAvg+β) or a of the candidate is the same as one of the existing candidates, the model of the candidate is not included. For another example, if the difference of (α×lumaAvg+β) or a between the candidate and one of existing candidates is less than a threshold, the model of the candidate is not included. Besides, the threshold can be adaptive based on coding information (e.g., the current block size or area). For another example, when comparing the similarity, if a model from a candidate and the existing model both use CCCM, it can compare similarity by checking the value of ($c_0C+c_1N+c_2S+c_3E+c_4W+c_5P+c_6B$) to decide whether to include the model of a candidate or not. In another embodiment, if a candidate position point to a CU which is the same one of the existing candidates, the model of the candidate parameter is not included. In still another embodiment, if the model of a candidate is similar to one of existing candidate models, it can adjust the inherited model parameters so that the inherited model is different from the existing candidate models. For example, if the inherited scaling parameter is similar to one of existing candidate models, the inherited scaling parameter can add a predefined offset (e.g., 1>>S or −(1>>S), where S is the shift parameter) so that the inherited parameter is different from the existing candidate models.

In another embodiment, a default candidate can be a shortcut to indicate a cross-component mode (i.e., using the current neighbouring luma/chroma reconstructed samples to derive cross-component models) rather than inheriting parameters from neighbours. For example, default candidate can be CCLM_LA, CCLM_L, CCLM_A, MMLM_LA, MMLM_L, MMLM_A, single model CCCM, multiple models CCCM or cross-component model with a specified GLM pattern.

In another embodiment, a default candidate could be a cross-component mode (i.e., using the current neighbouring luma/chroma reconstructed samples to derive cross-component models) rather than inheriting parameters from neighbours, and also with a scaling parameter update (Δα). Then, the scaling parameter of a default candidate is (α+Δα). For example, default candidate can be CCLM_LA, CCLM_L, CCLM_A, MMLM_LA, MMLM_L, or MMLM_A. For another example, Aa can be 1/8, −1/8, +2/8, −2/8, +3/8, −3/8, +4/8, −4/8. The offset parameter of a default candidate will be derived by (α+Δα) and the average value of neighbouring luma and chroma samples of the current block. For still another example, the Δα could be different for each colour components.

In another embodiment, a default candidate could be an earlier candidate with partial selected model parameters. For example, suppose an earlier candidate has m parameters, it can choose k out of m parameters from the earlier candidate to be a default candidate, where 0<k<m and m>1.

In another embodiment, a default candidate can be the first model of an earlier MMLM candidate (i.e., the model used when the sample value is less than or equal to classification threshold). In still another embodiment, a default candidate could be the second model of an earlier MMLM candidate (i.e., the model used when the sample value is greater than or equal to classification threshold). In still another embodiment, a default candidate could be the combination of two models of an earlier MMLM candidate. For example, if the models of an earlier MMLM candidate are $$\{c_0^0, c_1^0, \ldots, c_{M-1}^0\} \text{ and } \{c_0^1, c_1^1, \ldots, c_{M-1}^1\}.$$

The model parameters of an default candidate could be $$\{(1-\alpha)\times c_0^0+\alpha\times c_0^1, (1-\alpha)\times c_1^0+\alpha\times c_1^0, \ldots, (1-\alpha)\times c_{M-1}^0+\alpha\times c_{M-1}^1\},$$

where α is a weighting factor which can be predefined or implicitly derived by neighbouring template cost, and $$c_x^y$$

is the x-th parameter of the y-th model.

Reordering the Candidates in the List

The candidates in the list can be reordered to reduce the syntax overhead when signalling the selected candidate index. The reordering rules can depend on the coding information of neighbouring blocks or the model error. For example, if neighbouring above or left blocks are coded by MMLM, the MMLM candidates in the list can be moved to the head of the current list. Similarly, if neighbouring above or left blocks are coded by single model LM or CCCM, the single model LM or CCCM candidates in the list can be moved to the head of the current list. Similarly, if GLM is used by neighbouring above or left blocks, the GLM related candidates in the list can be moved to the head of the current list.

Figure 21:
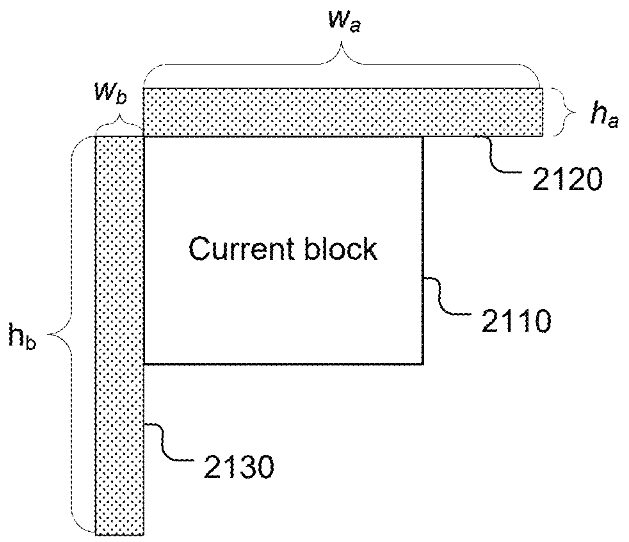
FIG. 21 illustrates an example of neighbouring templates for calculating model error.

In still another embodiment, the reordering rule is based on the model error by applying the candidate model to the neighbouring templates of the current block, and then compare the error with the reconstructed samples of the neighbouring template. For example, as shown in FIG. 21, the size of above neighbouring template 2620 of the current block is $w_a \times h_a$, and the size of left neighbouring template 2630 of the current block 2610 is $w_b \times h_b$. Suppose K models are in the current candidate list, and $\alpha_k$ and $\beta_k$ are the final scale and offset parameters after inheriting the candidate k. The model error of candidate k corresponding to the above neighbouring template is:

$$e_a^k = \sum_{i,j}\left|\left(\alpha_k \times recL_a'^{(i,j)} + \beta_k\right) - recC_a^{(i,j)}\right|$$

where, $$recL_a'^{(i,j)} \text{ and } recC_a^{(i,j)}$$

are the reconstructed samples of luma (e.g., after downsampling process or after applying GLM pattern) and reconstructed samples of chroma at position (i, j) in the above template, and $0 \le i < w_a$ and $0 \le j < h_a$.

Similarly, the model error of candidate k by the left neighbouring template is:

$$e_b^k = \sum_{m,n} \left| \left( \alpha_k \times recL_b'^{(m,n)} + \beta_k \right) - recC_b^{(m,n)} \right|$$

where $$recL_b'^{(m,n)} \text{ and } recC_b^{(m,n)}$$

are the reconstructed samples of luma (e.g., after applying downsampling process or GLM pattern) and reconstructed samples of chroma at position (m, n) in the left template, and $0 \le m < w_b$ and $0 \le n < h_b$.

Then the model error of candidate k is:

$$e^k = e_a^k + e_b^k$$

After calculating the model error among all candidates, it can get a model error list $E = \{e^0, e^1, e^2, \ldots, e^k, \ldots, e^K\}$. Then, it can reorder the candidate index in the inherited candidate list by sorting the model error list in ascending order.

In still another embodiment, if the candidate k uses CCCM prediction, the $$e_a^k \text{ and } e_b^k$$

are defined as:

$$e_a^k = \sum_{i,j} \left| \left( c0_k \times recL_a'^{(i,j)} + c1_k \times recL_a'^{(i,j-1)} + c2_k \times recL_a'^{(i,j+1)} + c3_k \times recL_a'^{(i-1,j)} + c4_k \times recL_a'^{(i+1,j)} + c5_k \times P + c6_k \times B \right) - recC_a^{(i,j)} \right|$$

$$e_b^k = \sum_{i,j} \left| \left( c0_k \times recL_b'^{(i,j)} + c1_k \times recL_b'^{(i,j-1)} + c2_k \times recL_b'^{(i,j+1)} + c3_k \times recL_b'^{(i-1,j)} + c4_k \times recL_b'^{(i+1,j)} + c5_k \times P + c6_k \times B \right) - recC_b^{(i,j)} \right|$$

where $c0_k$, $c1_k$, $c2_k$, $c3_k$, $c4_k$, $c5_k$, and $c6_k$ are the final filtering coefficients after inheriting the candidate k. P and B are the nonlinear term and bias term.

In still another embodiment, if the above neighbouring template is not available, then $$e^k = e_b^k.$$

Similarly, if the left neighbouring template is not available, then $$e^k = e_a^k.$$

If both templates are not available, the candidate index reordering method using model error is not applied.

In still another embodiment, not all positions inside the above and left neighbouring template are used in calculating model error. It can choose partial positions inside the above and left neighbouring template to calculate model error. For example, it can define a first start position and a first subsampling interval depends on the width of the current block to partially select positions inside the above neighbouring template. Similarly, it can define a second start position and a second subsampling interval depends on the height of the current block to partially select positions inside the left neighbouring template. For another example, $h_a$ or $h_b$ can be a constant value (e.g., $h_a$ or $h_b$ can be 1, 2, 3, 4, 5, or 6). For another example, $h_a$ or $h_b$ can be dependent on the block size. If the current block size is greater than or equal to a threshold, $h_a$ or $h_b$ is equal to a first value. Otherwise, $h_a$ or $h_b$ is equal to a second value.

In still another embodiment, the candidates of different types are reordered separately before the candidates are added into the final candidate list. For each type of the candidates, the candidates are added into a primary candidate list with a pre-defined size $N_1$. The candidates in the primary list are reordered. The candidates ($N_2$) with the smallest costs are then added into the final candidate list, where $N_2 \le N_1$. In another embodiment, the candidates are categorized into different types based on the source of the candidates, including but not limited to the spatial neighbouring models, temporal neighbouring models, non-adjacent spatial neighbouring models, and the historical candidates. In another embodiment, the candidates are categorized into different types based on the cross-component model mode. For example, the types could be CCLM, MMLM, CCCM, and CCCM multi-model. For another example, the types could be GLM-non active or GLM active.

In still another embodiment, after the candidates are reordered based on the template cost, the redundancy of the candidate can be further checked. A candidate is considered to be redundant if the template cost difference between it and its predecessor in the list is smaller than a threshold. If a candidate is considered redundant, it can be removed from the list, or it can be move to the end of the list.

Inheriting Candidates from the Candidates in the Candidate List of Neighbours

Figure 22:
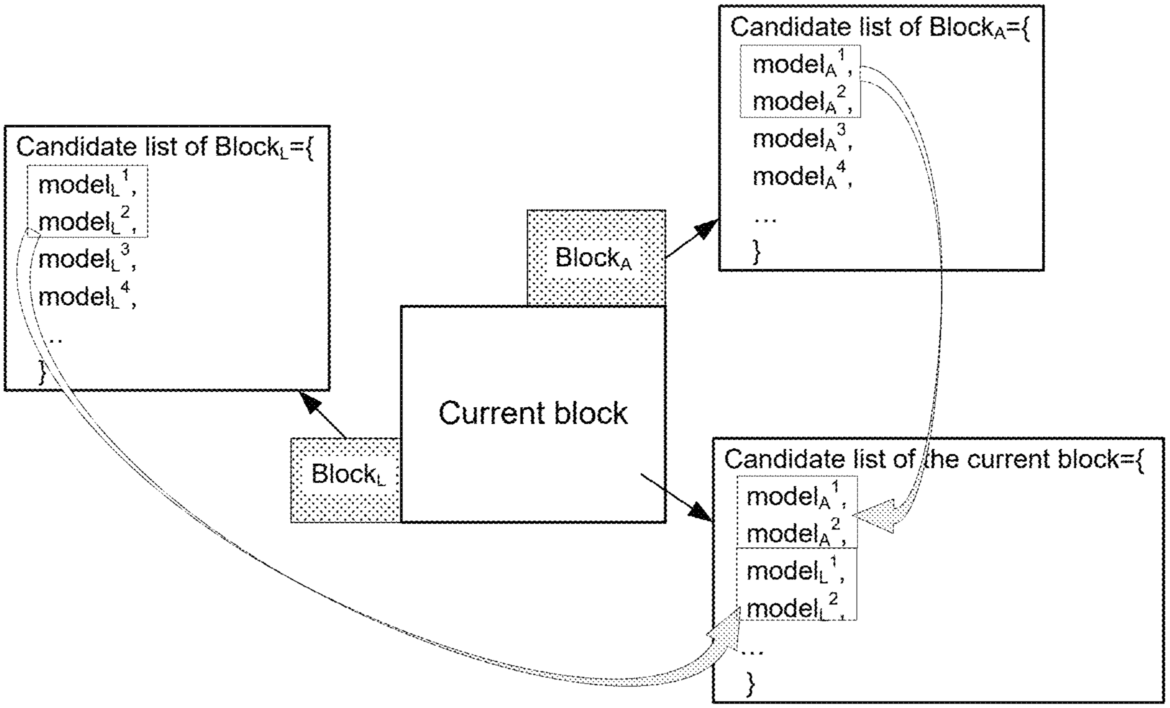
FIG. 22 illustrates an example of inheriting candidates from the candidates in the candidate list of neighbour blocks.

The candidates in the current inherited candidate list can be from neighbouring blocks. For example, it can inherit the first k candidates in the inherited candidate list of the neighbouring blocks. As shown in the FIG. 22, the current block can inherit the first two candidates in the inherited candidate list of the above neighbouring block and the first two candidates in the inherited candidate list of the left neighbouring block. For an embodiment, after adding the neighbouring spatial candidates and non-adjacent spatial candidates, if the current inherited candidate list is not full, the candidates in the candidate list of neighbouring blocks are included into the current inherited candidate list. For another embodiment, when including the candidates in the candidate list of neighbouring blocks, the candidates in the candidate list of left neighbouring blocks are included before the candidates in the candidate list of above neighbouring blocks. For still another embodiment, when including the candidates in the candidate list of neighbouring blocks, the candidates in the candidate list of above neighbouring blocks are included before the candidates in the candidate list of left neighbouring blocks.

Signalling the Inherit Candidate Index in the List

An on/off flag can be signalled to indicate if the current block inherits the cross-component model parameters from neighbouring blocks or not. The flag can be signalled per CU/CB, per PU, per TU/TB, or per colour component, or per chroma colour component. A high level syntax can be signalled in SPS, PPS (Picture Parameter Set), PH (Picture header) or SH (Slice Header) to indicate if the proposed method is allowed for the current sequence, picture, or slice.

If the current block inherits the cross-component model parameters from neighbouring blocks, the inherit candidate index is signalled. The index can be signalled (e.g., signalled using truncate unary code, Exp-Golomb code, or fix length code) and shared among both the current Cb and Cr blocks. For another example, the index can be signalled per colour component. For example, one inherited index is signalled for Cb component, and another inherited index is signalled for Cr component. For another example, it can use chroma intra prediction syntax (e.g., IntraPredModeC[xCb][yCb]) to store the inherited index.

If the current block inherits the cross-component model parameters from neighbouring blocks, the current chroma intra prediction mode (e.g., IntraPredModeC[xCb][yCb] as defined in VVC standard) is temporally set to a cross-component mode (e.g., CCLM_LA) at the bitstream syntax parsing stage. Later, at the prediction stage or reconstruction stage, the candidate list is derived, and the inherited candidate model is then determined by the inherited candidate index. After obtaining the inherited model, the coding information of the current block is then updated according to the inherited candidate model. The coding information of the current block includes but not limited to the prediction mode (e.g., CCLM_LA or MMLM_LA), related sub-mode flags (e.g., CCCM mode flag), prediction pattern (e.g., GLM pattern index), and the current model parameters. Then, the prediction of the current block is generated according to the updated coding information.

Inheriting Multiple Cross-Component Models

The final prediction of the current block can be the combination of multiple cross-component models, or fusion of the selected cross-component models with the prediction by non-cross-component coding tools (e.g., intra angular prediction modes, intra planar/DC modes, or inter prediction modes). In one embodiment, if the current candidate list size is N, it can select k candidates from the total N candidates (where k≤N). Then, k predictions are respectively generated by applying the cross-component model of the selected k candidates using the corresponding luma reconstruction samples. The final prediction of the current block is the combination results of these k predictions. For example, if two candidate predictions (denoted as $p_{cand1}$ and $p_{cand2}$) are combined, the final prediction at (x, y) position of the current block is $p_{final}(x, y)=(1-a)\times p_{cand1}(x, y)+\alpha\times p_{cand2}(x, y)$, where a is a weighting factor. Besides, the weighting factor α can be predefined or implicitly derived by neighbouring template cost. For example, by using the template cost defined in the section entitled: Inherit non-adjacent spatial neighbouring models, the corresponding template cost of two candidates are $e^{cand1}$ and $e^{cand2}$, then α is $e^{cand1}/(e^{cand1}+e^{cand2})$. In another embodiment, if two candidate models are combined, the selected models are from the first two candidates in the list. In still another embodiment, if i candidate models are combined, the selected models are from the first i candidates in the list.

In another embodiment, if the current candidate list size is N, it can select k candidates from the total N candidates (where k≤N). The k cross-component models can be combined into one final cross-component model by weighted-averaging the corresponding model parameters. For example, if a cross-component model has M parameters, the j-th parameter of the final cross-component model is the weighted-averaging of the j-th parameter of the k selected candidate, where j is 1 . . . . M. Then, the final prediction is generated by applying the final cross-component model to the corresponding luma reconstructed samples. For example, if two candidate models are $$\{c_0^0, c_1^0, \ldots, c_{M-1}^0\} \text{ and } \{c_0^1, c_1^1, \ldots, c_{M-1}^1\}.$$

The final cross-component model is $$\{(1-\alpha)\times c_0^0+\alpha\times c_0^1, (1-\alpha)\times c_1^0+\alpha\times c_1^1, \ldots, (1-\alpha)\times c_{M-1}^0+\alpha\times c_{M-1}^1\},$$

where α is a weighting factor which can be predefined or implicitly derived by neighbouring template cost, and $$c_x^y$$

is the x-th model parameter of the y-th candidate. For example, by using the template cost defined in the section entitled: Inherit non-adjacent spatial neighbouring models, the corresponding template cost of two candidates are $e^{cand1}$ and $e^{cand2}$, then α is $e^{cand1}/(e^{cand1}+e^{cand2})$. For still an example, the two candidate models are one from the spatial adjacent neighbouring candidate, and another one from the non-adjacent spatial candidate or history candidate. If the spatial adjacent neighbouring candidate is not available, then the two candidate models are all from the non-adjacent spatial candidates or history candidates. In another embodiment, if two candidate models are combined, the selected models are from the first two candidates in the list. In still another embodiment, if i candidate model is combined, the selected models are from the first i candidate in the list.

In another embodiment, two cross-component models are combined into one final model by weighted-averaging the corresponding model parameters, where the two cross-component models are one from the above spatial neighbouring candidate and another one from the left spatial neighbouring candidate. The above spatial neighbouring candidate is the neighbouring candidate that has the vertical position less than or equal to the top block boundary position of the current block. The left spatial neighbouring candidate is the neighbouring candidate that has the horizontal position less than or equal to the left block boundary position of the current block. The weighting factor α is determined according to the horizontal and vertical spatial positions inside the current block. For example, if two candidate predictions (denoted as $p_{above}$ and $p_{left}$) are combined, the final prediction at (x, y) position of the current block is $p_{final}(x, y)=(1-\alpha)\times p_{above}(x, y)+\alpha\times p_{left}(x, y)$, where $\alpha=y/(x+y)$. In another embodiment, the above spatial neighbouring candidate is the first candidate in the list that has the vertical position less than or equal to the top block boundary position of the current block. The left spatial neighbouring candidate is the first candidate in the list that has the horizontal position less than or equal to the left block boundary position of the current block.

In another embodiment, it can combine cross-component model candidates with the prediction by non-cross-component coding tools. For example, one cross-component model candidate is selected from a list, and its prediction is denoted as $p_{ccm}$. Another prediction can be from chroma DM, chroma DIMD, or intra angular mode, and denoted as $p_{non\text{-}ccm}$. The final prediction at (x, y) position of the current block is $p_{final}(x, y)=(1-\alpha)\times p_{ccm}(x, y)+\alpha\times p_{non\text{-}ccm}(x, y)$, where $\alpha$ is the weighting factor, which can be predefined or implicitly derived by neighbouring template cost. For still the same example, the prediction by a non-cross-component coding tool can be predefined or signalled. The prediction by non-cross-component coding tool is chroma DM or chroma DIMD. For another example, prediction by non-cross-component coding tool is signalled, but the index of cross-component model candidate is predefined or determined by the coding modes of neighbouring blocks. For still the same example, if at least one of neighbouring spatial blocks is coded with CCCM mode, the first candidate has CCCM model parameters is selected. If at least one of neighbouring spatial blocks is coded with GLM mode, the first candidate has GLM pattern parameters is selected. Similarly, if at least one of neighbouring spatial blocks is coded with MMLM mode, the first candidate has MMLM parameters is selected.

In another embodiment, it can combine cross-component model candidates with the prediction by the current cross-component model. For example, one cross-component model candidate is selected from the list, and its prediction is denoted as $p_{ccm}$. Another prediction can be from the cross-component prediction mode by the current neighbouring reconstructed samples and denoted as $p_{curr\text{-}ccm}$. The final prediction at (x, y) position of the current block is $p_{final}(x, y)=(1-\alpha)\times p_{ccm}(x, y)+\alpha\times p_{curr\text{-}ccm}(x, y)$, where $\alpha$ is the weighting factor which could be predefined or implicitly derived according to neighbouring template cost. For still the same example, the prediction by the current cross-component model can be predefined or signalled. The prediction by the non-cross-component coding tool is CCCM_LT, LM_LT (i.e., single model LM using both top and left neighbouring samples to derive the model), or MMLM_LT (i.e., multi-model LM using both top and left neighbouring samples to derive the model). In one embodiment, the selected cross-component model candidate is the first candidate in the list.

In another embodiment, it can combine multiple cross-component models into one final cross-component model. For example, it can choose one model from a candidate, and choose a second model from another candidate to be a multi-model mode. The selected candidate can be CCLM/MMLM/GLM/CCCM coded candidate. The multi-model classification threshold can be the average of the offset parameters (e.g., offset/$\beta$ in CCLM, or $c_6\times B$ or $c_6$ in CCCM) of the two selected modes. In one embodiment, if two candidate models are combined, the selected models are the first two candidates in the list. In another embodiment, the classification threshold is set to the average value of the neighbouring luma or chroma samples of the current block.

Refining the Inherited Candidate Positions

In one embodiment, the final inherited model of the current block is from the cross-component model at the indicated candidate position with a delta position. For example, if the current selected candidate position is $$(x_{nei}^i, y_{nei}^i),$$

it can further signal a delta position, $$(dx_{nei}^i, dy_{nei}^i),$$

to indicate the position of the final inherited model. That is, the final inherited model of the current block is from the cross-component model at $$(x_{nei}^i + dx_{nei}^i, y_{nei}^i + dy_{nei}^i).$$

In one embodiment, the signal delta position can only have a horizontal delta position or a vertical delta position, that is, $$(dx_{nei}^i, 0) \text{ or } (0, dy_{nei}^i).$$

Besides, the signalled delta position can be shared among multiple colour components or signalled per colour component. For example, the signalled delta position is share for the current Cb and Cr blocks, or the signalled delta position is only used for the current Cb block or the current Cr block. Furthermore, the signalled $$dx_{nei}^i \text{ or } dy_{nei}^i$$

may have a sign vit to indicate positive delta position or negative delta position. When indicating the magnitude of $$dx_{nei}^i \text{ or } dy_{nei}^i.$$

it can be signalled by a look-up table index. For example, a look-up table is {1, 2, 4, 8, 16, . . . }, if $$|dx_{nei}^i|$$

is equal to 8, then the table index 3 is signalled (the first table index is 0).

In one embodiment, when a candidate is selected from the candidate list, the models from the neighbouring positions of the selected candidate are further searched. The final inherited model can be from the neighbouring position of the selected candidate. Positions of a pre-defined search pattern inside an area around the selected candidate is searched. In one embodiment, the neighbouring positions searched are either horizontally different or vertically different from the selected candidate, that is, the delta position is either $$(dx_{nei}^i, 0) \text{ or } (0, dy_{nei}^i).$$

In another embodiment, the neighbouring positions searched are diagonally different from the selected candidate, that is, the delta position is $$\left(dx^i_{nei}, dy^i_{nei}\right), \text{ where } dx^i_{nei} = \pm dy^i_{nei}.$$

Note, the delta position can be a positive of negative number.

In another embodiment, the models from the neighbouring positions of the candidate are further searched only when the selected candidate is a non-adjacent candidate. Positions of a pre-defined search pattern inside an area around the selected candidate are searched. For example, suppose the distances between the non-adjacent candidates are the current coding block width and height. After a non-adjacent candidate is selected, the positions whose horizontal distance and vertical distance are both smaller than current coding block width and height respectively are further searched, i.e., $$dx^i_{nei}$$

is within the range of ±width and $$dy^i_{nei}$$

is within the range of ±height. In one embodiment, the neighbouring positions searched are either horizontally different or vertically different from the selected candidate, that is, the delta position is either $$\left(dx^i_{nei}, 0\right) \text{ or } \left(0, dy^i_{nei}\right).$$

In another embodiment, the neighbouring positions searched are diagonally different from the selected candidate, that is, the delta position is $$\left(dx^i_{nei}, dy^i_{nei}\right), \text{ where } dx^i_{nei} = \pm dy^i_{nei}.$$

Inheriting from Shared Cross-Component Models

In one embodiment, the current picture is segmented into multiple non-overlapped regions, and each region size is M×N. A shared cross-component model is derived for each region, respectively. The neighbouring available luma/chroma reconstructed samples of the current region are used to derive the shared cross-component model of the current region. Then, for a block inside the current region, it can determine whether to inherit the shared cross-component model or derive cross-component model by the neighbouring available luma/chroma reconstructed samples of the block. In one embodiment, the M×N can be a predefined value (e.g. 32×32 regarding to the chroma format), a signalled value (e.g. signalled in sequence/picture/slice/tile-level), a derived value (e.g. depending on the CTU size), or the maximum allowed transform block size.

In another embodiment, each region may have more than one shared cross-component model. For example, it can use various neighbouring templates (e.g., top and left neighbouring samples, top-only neighbouring samples, left-only neighbouring samples) to derive more than one shared cross-component model. Besides, the shared cross-component models of the current region can be inherited from previously used cross-component models. For example, the shared model can be inherited from the models of adjacent spatial neighbours, non-adjacent spatial neighbours, temporal neighbours, or from a historical list.

When doing signalling, a first flag can be used to determine if the current cross-component model is inherited from the shared cross-component models or not. If the current cross-component model is inherited from the shared cross-component models, the second syntax indicate the inherited index of the shared cross-component models (e.g., signalled using truncate unary code, Exp-Golomb code, or fixed length code).

Figure 1B:
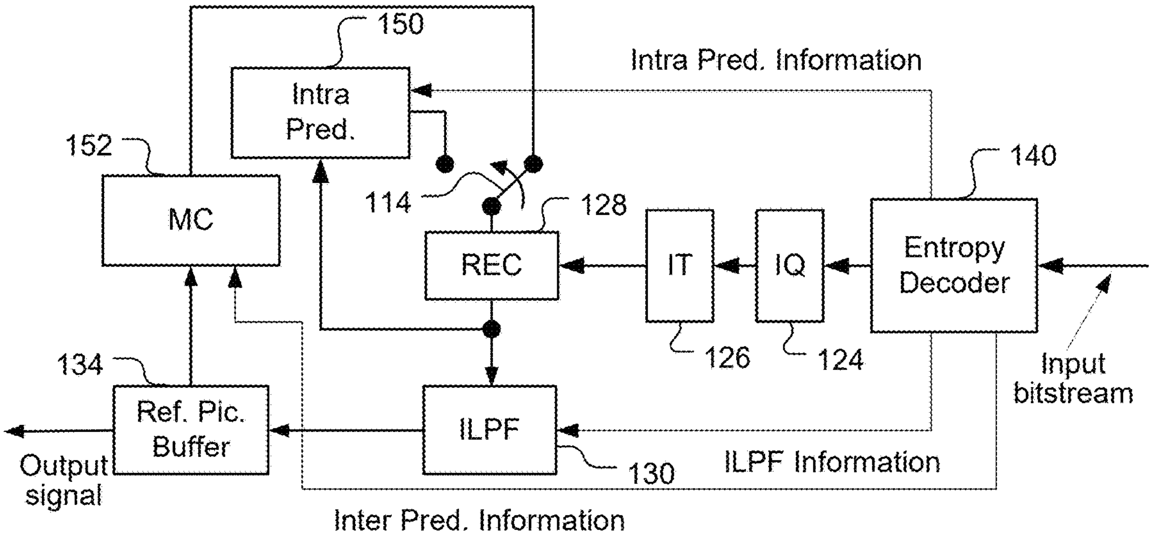
FIG. 1B illustrates a corresponding decoder for the encoder in FIG. 1A.
Figure 2:
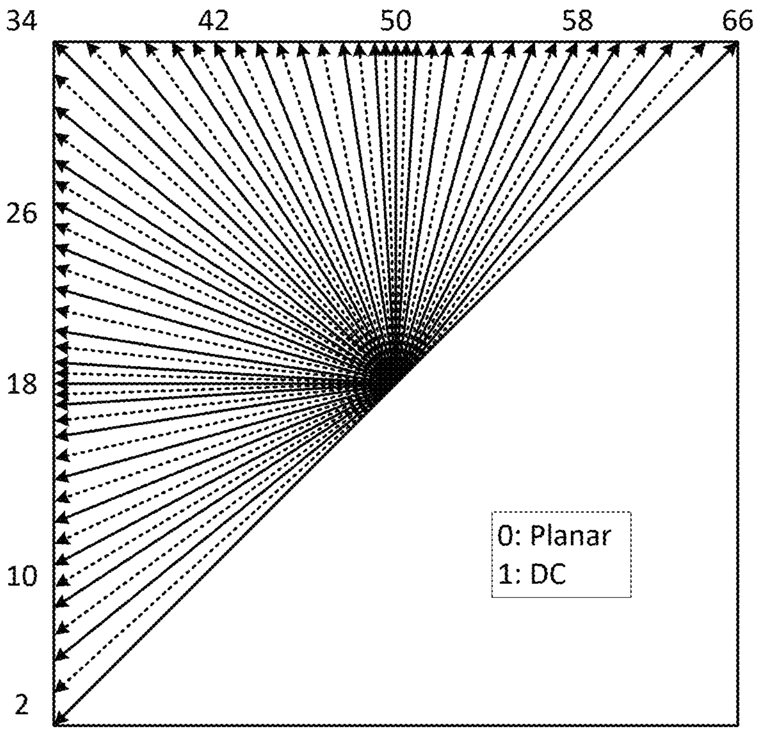
FIG. 2 shows the intra prediction modes as adopted by the VVC video coding standard.
Figure 3:
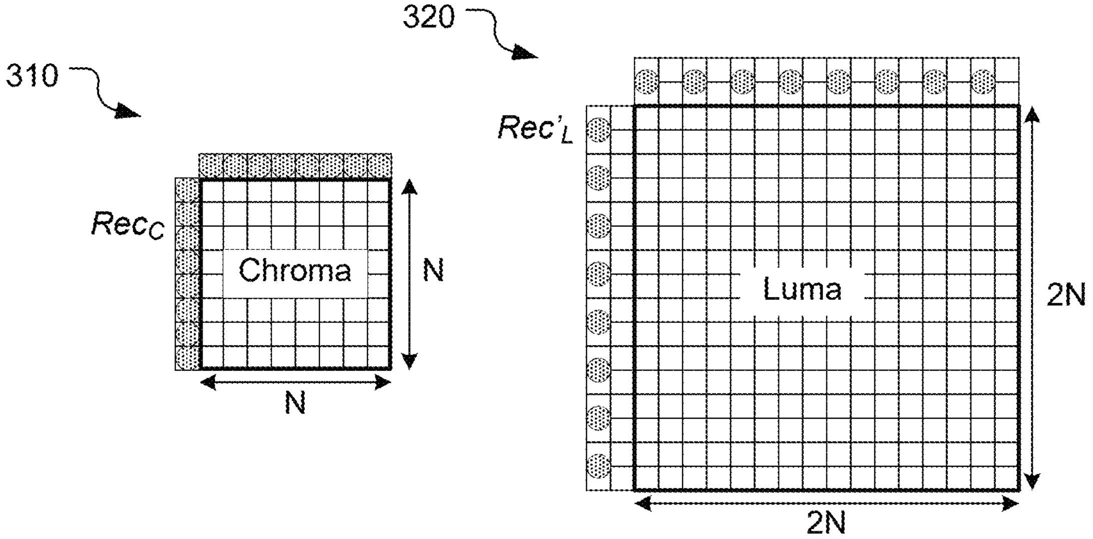
FIG. 3 shows an example of the location of the left and above samples and the sample of the current block involved in the LM_LA mode.
Figure 4:
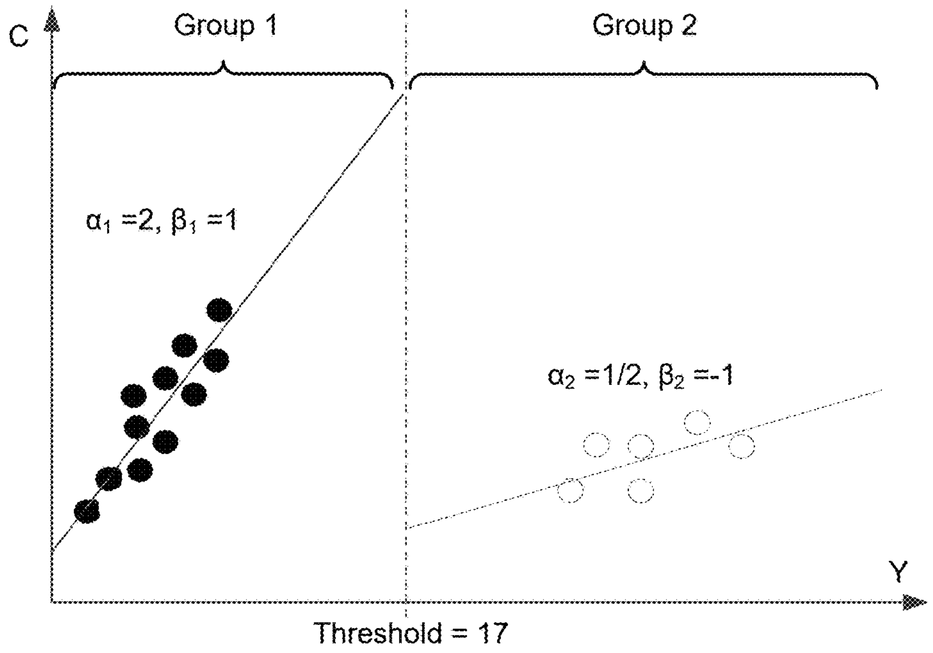
FIG. 4 shows an example of classifying the neighbouring samples into two groups.
Figure 5A:
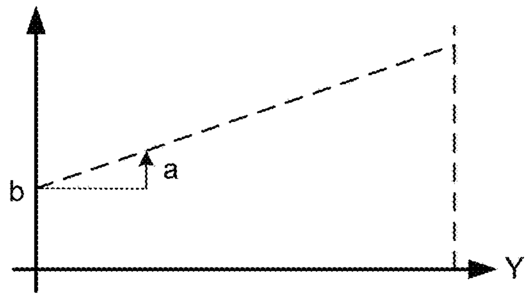
FIG. 5A illustrates an example of the CCLM model.
Figure 5B:
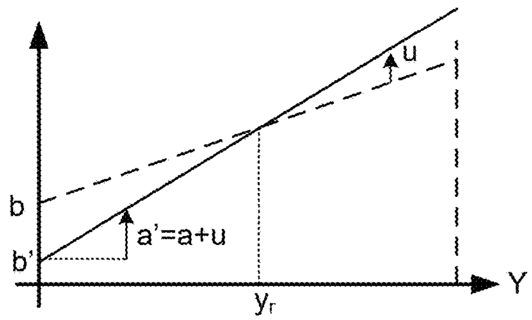
FIG. 5B illustrates an example of the effect of the slope adjustment parameter "u" for model update.
Figure 6:
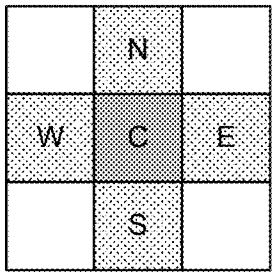
FIG. 6 illustrates an example of spatial part of the convolutional filter.
Figure 7:
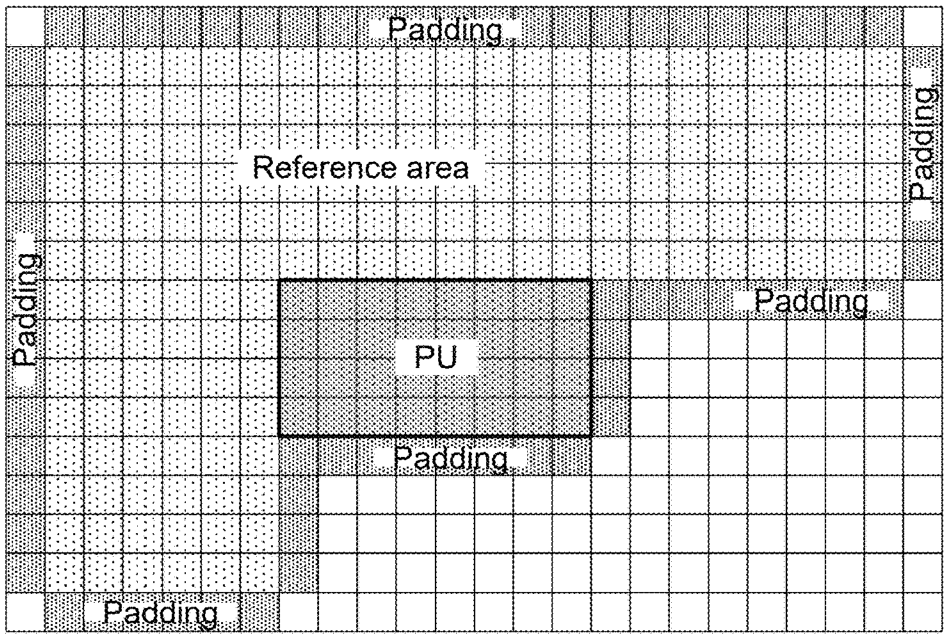
FIG. 7 illustrates an example of reference area with paddings used to derive the filter coefficients.
Figure 8:
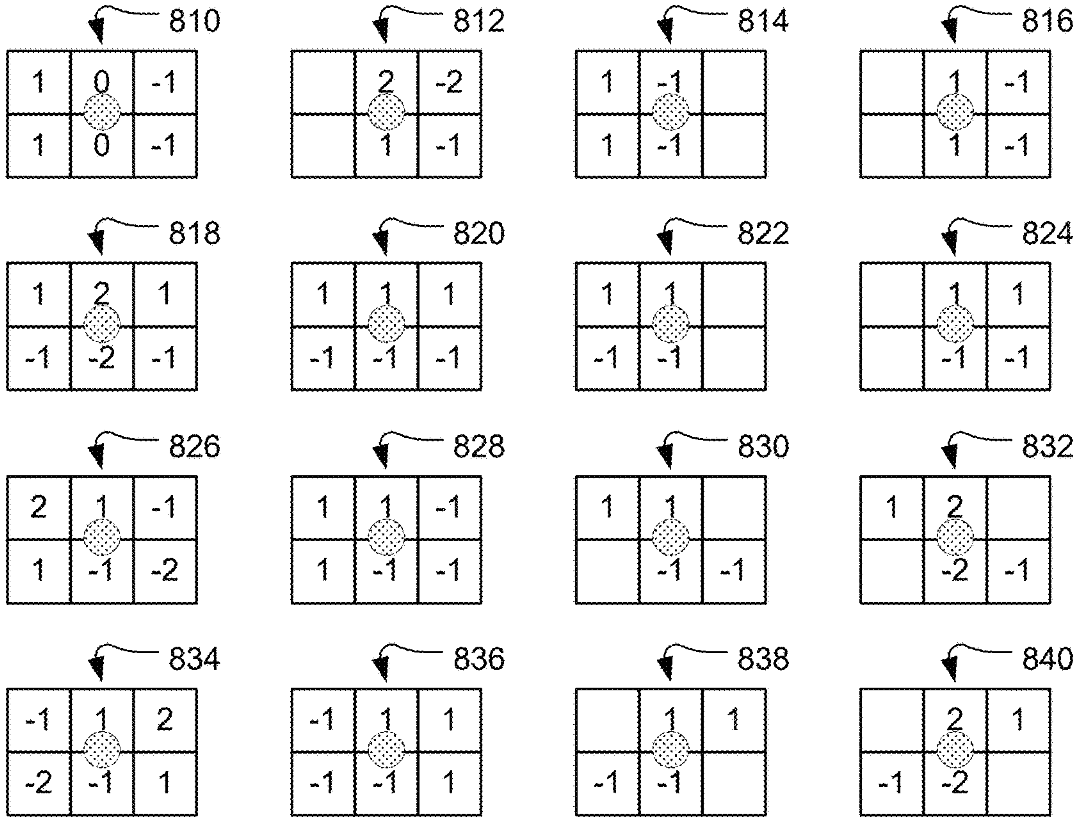
FIG. 8 illustrates the 16 gradient patterns for Gradient Linear Model (GLM).
Figure 9:
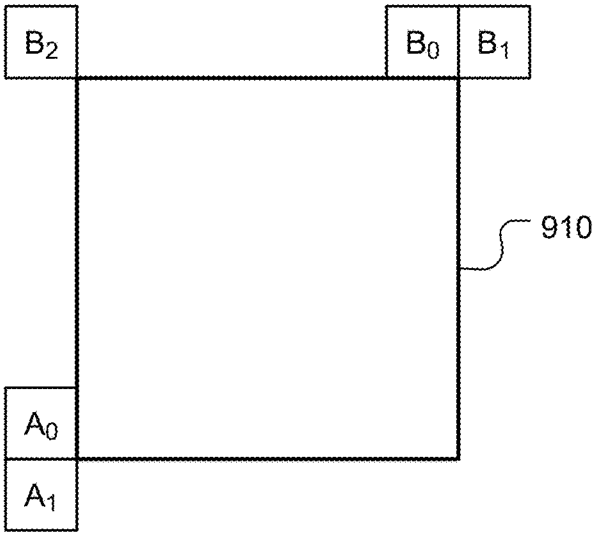
FIG. 9 illustrates the neighbouring blocks used for deriving spatial merge candidates for VVC.
Figure 10:
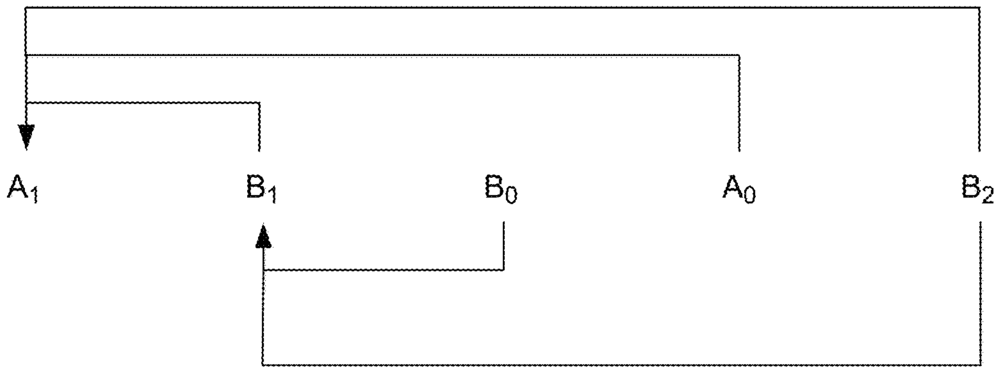
FIG. 10 illustrates the possible candidate pairs considered for redundancy check in VVC.
Figure 11:
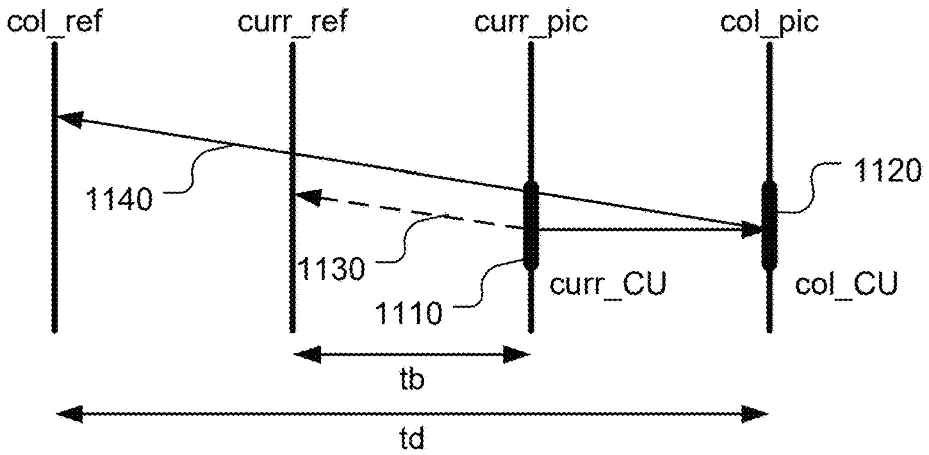
FIG. 11 illustrates an example of temporal candidate derivation, where a scaled motion vector is derived according to POC (Picture Order Count) distances.
Figure 12:
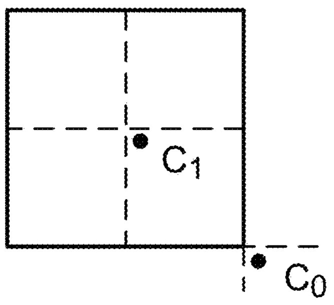
FIG. 12 illustrates the position for the temporal candidate selected between candidates $C_0$ and $C_1$.

The inherited cross-component information propagation and innovative default cross-component candidate derivation as described above can be implemented in an encoder side or a decoder side. For example, any of the proposed inherited cross-component information propagation and innovative default cross-component candidate derivation can be implemented in an Intra/Inter coding module (e.g. Intra Pred. 150/MC 152 in FIG. 1B) in a decoder or an Intra/Inter coding module is an encoder (e.g. Intra Pred. 110/Inter Pred. 112 in FIG. 1A). Any of the proposed cross component prediction with inherited model parameters methods can also be implemented as a circuit coupled to the intra/inter coding module at the decoder or the encoder. However, the decoder or encoder may also use additional processing unit to implement the required cross-component prediction processing. While the Intra Pred. units (e.g. unit 110/112 in FIG. 1A and unit 150/152 in FIG. 1B) are shown as individual processing units, they may correspond to executable software or firmware codes stored on a media, such as hard disk or flash memory, for a CPU (Central Processing Unit) or programmable devices (e.g. DSP (Digital Signal Processor) or FPGA (Field Programmable Gate Array)).

Figure 23:
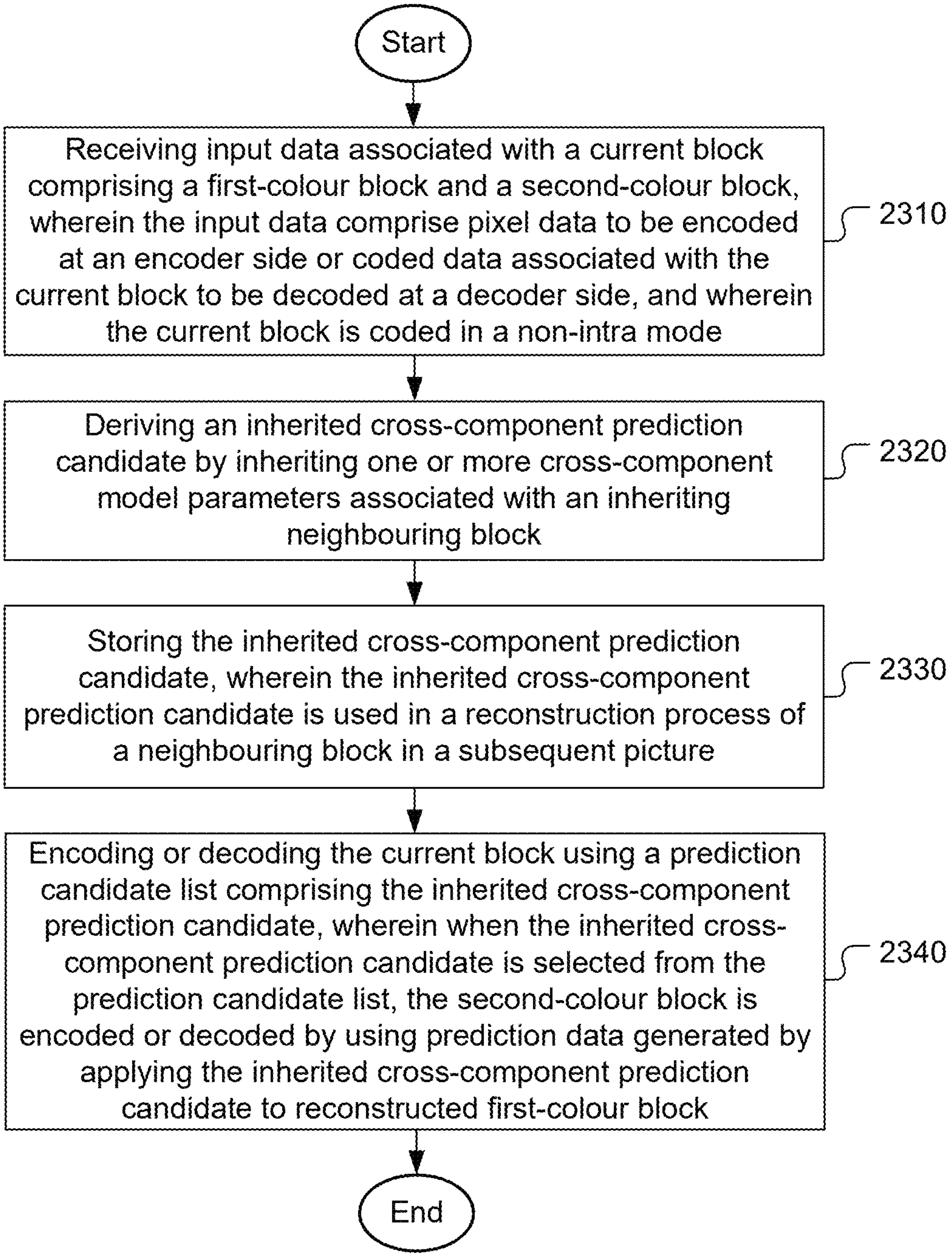
FIG. 23 illustrates a flowchart of an exemplary video coding system that incorporates inherited cross-component information propagation according to an embodiment of the present invention.

FIG. 23 illustrates a flowchart of an exemplary video coding system that incorporates inherited cross-component information propagation according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to the method, input data associated with a current block comprising a first-colour block and a second-colour block are received in step 2310, wherein the input data comprise pixel data to be encoded at an encoder side or coded data associated with the current block to be decoded at a decoder side, and wherein the current block is coded in a non-intra mode. An inherited cross-component prediction candidate is derived by inheriting one or more cross-component model parameters associated with an inheriting neighbouring block in step 2320. The inherited cross-component prediction candidate is stored in step 2330, wherein the inherited cross-component prediction candidate is used in a reconstruction process of a neighbouring block in a subsequent picture. The current block is encoded or decoded using a prediction candidate list comprising the inherited cross-component prediction candidate in step 2340, wherein when the inherited cross-component prediction candidate is selected from the prediction candidate list, the second-colour block is encoded or decoded by using prediction data generated by applying the inherited cross-component prediction candidate to reconstructed first-colour block.

Figure 24:
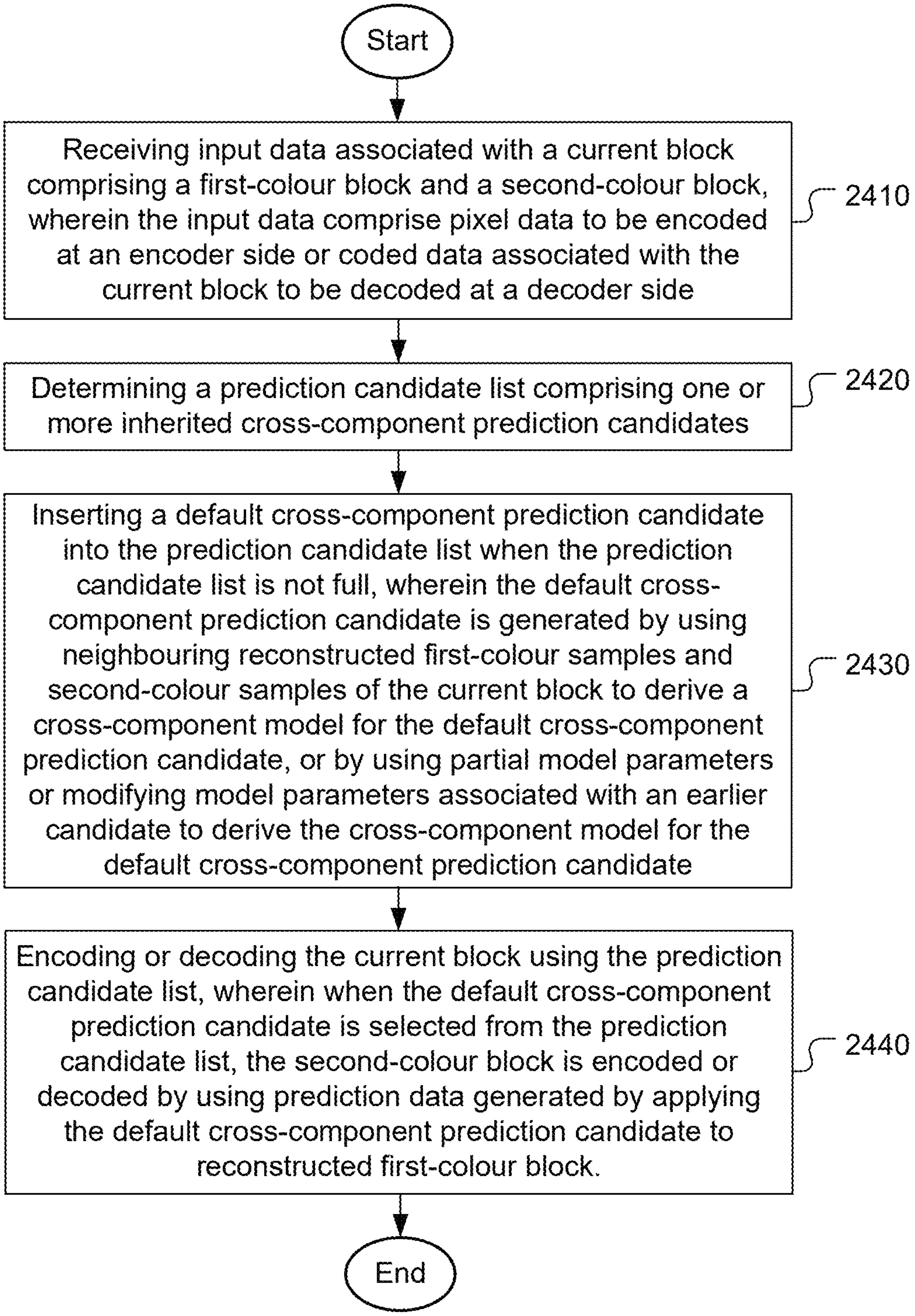
FIG. 24 illustrates a flowchart of an exemplary video coding system that incorporates innovative default cross-component candidate derivation according to an embodiment of the present invention.

FIG. 24 illustrates a flowchart of an exemplary video coding system that incorporates innovative default cross-component candidate derivation according to an embodiment of the present invention. According to this method, input data associated with a current block comprising a first-colour block and a second-colour block are received in step 2410, wherein the input data comprise pixel data to be encoded at an encoder side or coded data associated with the current block to be decoded at a decoder side. A prediction candidate list comprising one or more inherited cross-component prediction candidates is determined in step 2420. A default cross-component prediction candidate is inserted into the prediction candidate list when the prediction candidate list is not full in step 2430, wherein the default cross-component prediction candidate is generated by using neighbouring reconstructed first-colour samples and second-colour samples of the current block to derive a cross-component model for the default cross-component prediction candidate, or by using partial model parameters or modifying model parameters associated with an earlier candidate to derive the cross-component model for the default cross-component prediction candidate. The current block is encoded or decoded using the prediction candidate list in step 2440, wherein when the default cross-component prediction candidate is selected from the prediction candidate list, the second-colour block is encoded or decoded by using prediction data generated by applying the default cross-component prediction candidate to reconstructed first-colour block.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding colour pictures using coding tools including one or more cross component models related modes, the method comprising:

receiving input data associated with a current block comprising a first-colour block and a second-colour block, wherein the input data comprise pixel data to be encoded at an encoder side or coded data associated with the current block to be decoded at a decoder side, and wherein the current block is coded in a non-intra mode;

deriving an inherited cross-component prediction candidate by inheriting one or more cross-component model parameters associated with an inheriting neighbouring block;

storing the inherited cross-component prediction candidate, wherein the inherited cross-component prediction candidate is used in a reconstruction process of a neighbouring block in a subsequent picture;

encoding or decoding the current block using a prediction candidate list comprising the inherited cross-component prediction candidate, wherein when the inherited cross-component prediction candidate is selected from the prediction candidate list, the second-colour block is encoded or decoded by using prediction data generated by applying the inherited cross-component prediction candidate to reconstructed first-colour block.

2. The method of claim 1, wherein the current block corresponds to a uni-direction coded block, and the inheriting neighbouring block corresponds to a reference block in a reference picture located according to a motion vector of the current block, and the reference block is intra coded and has cross-component model information.

3. The method of claim 1, wherein the current block corresponds to a uni-direction coded block, and the inheriting neighbouring block corresponds to a reference block in a reference picture located according to a motion vector of the current block, and the reference block is inter coded and inherits cross-component model information from a corresponding reference block of the reference block.

4. The method of claim 1, wherein the current block corresponds to a bi-direction coded block, and the inheriting neighbouring block corresponds to a reference block in one of two reference pictures located according to a motion vector of the current block, and the reference block is intra coded and has cross-component model information.

5. The method of claim 1, wherein the current block corresponds to a bi-direction coded block, and the inheriting neighbouring block corresponds to a reference block in one of two reference pictures located according to a motion vector of the current block, and the reference block is inter coded and inherits cross-component model information from a corresponding reference block of the reference block.

6. The method of claim 1, wherein the current block corresponds to a bi-direction coded block, and two reference blocks in two reference pictures are located according respective motion vectors of the current block, and the two reference blocks are intra coded with respective cross-component model information, and wherein the inherited cross-component prediction candidate combines the respective cross-component model information.

7. An apparatus for video coding, the apparatus comprising one or more electronics or processors arranged to:

receive input data associated with a current block comprising a first-colour block and a second-colour block, wherein the input data comprise pixel data to be encoded at an encoder side or coded data associated with the current block to be decoded at a decoder side, and wherein the current block is coded in a non-intra mode;

derive an inherited cross-component prediction candidate by inheriting one or more cross-component model parameters associated with an inheriting neighbouring block;

store the inherited cross-component prediction candidate, wherein the inherited cross-component prediction candidate is used in a reconstruction process of a neighbouring block in a subsequent picture;

encode or decode the current block using a prediction candidate list comprising the inherited cross-component prediction candidate, wherein when the inherited cross-component prediction candidate is selected from the prediction candidate list, the second-colour block is encoded or decoded by using prediction data generated by applying the inherited cross-component prediction candidate to reconstructed first-colour block.

8. A method of coding colour pictures using coding tools including one or more cross component models related modes, the method comprising:

receiving input data associated with a current block comprising a first-colour block and a second-colour block, wherein the input data comprise pixel data to be encoded at an encoder side or coded data associated with the current block to be decoded at a decoder side;

determining a prediction candidate list comprising one or more inherited cross-component prediction candidates;

inserting a default cross-component prediction candidate into the prediction candidate list when the prediction candidate list is not full, wherein the default cross-component prediction candidate is generated by using neighbouring reconstructed first-colour samples and second-colour samples of the current block to derive a cross-component model for the default cross-component prediction candidate, or by using partial model parameters or modifying model parameters associated with an earlier candidate to derive the cross-component model for the default cross-component prediction candidate; and encoding or decoding the current block using the prediction candidate list, wherein when the default cross-component prediction candidate is selected from the prediction candidate list, the second-colour block is encoded or decoded by using prediction data generated by applying the default cross-component prediction candidate to reconstructed first-colour block.

9. The method of claim 8, wherein the first-colour block corresponds to a luma block and the second-colour block corresponds to a chroma block, and wherein one or more parameters for the default cross-component prediction candidate are derived using neighbouring reconstructed luma samples and chroma samples of the current block.

10. The method of claim 9, wherein the default cross-component prediction candidate corresponds to CCLM_LA, CCLM_L, CCLM_A, MMLM_LA, MMLM_L, MMLM_A, single-model CCCM, multiple-model CCCM or cross-component model with a specified GLM pattern.

11. The method of claim 9, wherein a scaling parameter $\alpha$ for the default cross-component prediction candidate derived by using the neighbouring reconstructed luma samples and chroma samples of the current block is updated by adding an offset $\Delta\alpha$.

12. The method of claim 11, wherein the offset $\Delta\alpha$ is selected from a group including $+1/8$, $-1/8$, $+2/8$, $-2/8$, $+3/8$, $-3/8$, $+4/8$ and $-4/8$.

13. The method of claim 8, wherein the default cross-component prediction candidate is generated by copying k model parameters associated with the earlier candidate to derive the cross-component model for the default cross-component prediction candidate, and wherein the earlier candidate has m parameters and both k and m are positive integers and $0<k<m$.

14. The method of claim 8, wherein the earlier candidate corresponds to MMLM candidate and the default cross-component prediction candidate corresponds to first model of the MMLM candidate.

15. The method of claim 8, wherein the earlier candidate corresponds to MMLM candidate and the default cross-component prediction candidate corresponds to second model of the MMLM candidate.

16. The method of claim 8, wherein the earlier candidate corresponds to MMLM candidate and the default cross-component prediction candidate corresponds to a combination of first model and second model of the MMLM candidate.

17. An apparatus for video coding, the apparatus comprising one or more electronics or processors arranged to:

receive input data associated with a current block comprising a first-colour block and a second-colour block, wherein the input data comprise pixel data to be encoded at an encoder side or coded data associated with the current block to be decoded at a decoder side;

determine a prediction candidate list comprising one or more inherited cross-component prediction candidates;

insert a default cross-component prediction candidate into the prediction candidate list when the prediction candidate list is not full, wherein the default cross-component prediction candidate is generated by using neighbouring reconstructed first-colour samples and second-colour samples of the current block to derive a cross-component model for the default cross-component prediction candidate, or by using partial model parameters or modifying model parameters associated with an earlier candidate to derive the cross-component model for the default cross-component prediction candidate; and encode or decode the current block using the prediction candidate list, wherein when the default cross-component prediction candidate is selected from the prediction candidate list, the second-colour block is encoded or decoded by using prediction data generated by applying the default cross-component prediction candidate to reconstructed first-colour block.

* * * * *